(12) United States Patent
Marty et al.

(10) Patent No.: US 7,537,023 B2
(45) Date of Patent: May 26, 2009

(54) VALVE BODY ASSEMBLY WITH ELECTRONIC SWITCHING

(75) Inventors: Garry Robin Marty, Fishers, IN (US); Timothy Jay Sailors, Jr., Fishers, IN (US); Jeffrey Lee Moore, Frankfort, IN (US); Patrick B. Jonte, Zionsville, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 203 days.

(21) Appl. No.: 11/326,986

(22) Filed: Jan. 5, 2006

(65) Prior Publication Data

US 2006/0130908 A1 Jun. 22, 2006

Related U.S. Application Data

(63) Continuation-in-part of application No. 10/755,581, filed on Jan. 12, 2004, now Pat. No. 7,150,293.

(60) Provisional application No. 60/662,106, filed on Mar. 14, 2005.

(51) Int. Cl.
 *E03C 1/02* (2006.01)
(52) U.S. Cl. .................. 137/554; 137/801; 116/277
(58) Field of Classification Search .............. 137/553, 137/554, 801, 613, 624.11; 251/129.04; 4/623; 116/277
See application file for complete search history.

(56) References Cited

U.S. PATENT DOCUMENTS

| | | | |
|---|---|---|---|
| 3,056,418 A | 10/1962 | Adams et al. | |
| 3,333,160 A * | 7/1967 | Gorski | 251/129.04 |
| 4,200,123 A | 4/1980 | Brandelli | |
| 4,417,312 A * | 11/1983 | Cronin et al. | 137/487.5 |
| 4,709,728 A | 12/1987 | Ying-Chung | |
| 4,823,414 A | 4/1989 | Piersimoni et al. | |
| 4,826,129 A | 5/1989 | Fong et al. | |
| 4,869,287 A | 9/1989 | Pepper et al. | |
| 4,932,433 A | 6/1990 | Knapp | |
| 4,948,090 A | 8/1990 | Chen | |
| 5,025,516 A | 6/1991 | Wilson | |
| 5,074,520 A | 12/1991 | Lee et al. | |
| 5,224,509 A | 7/1993 | Tanaka et al. | |
| 5,243,717 A | 9/1993 | Yasuo | |

(Continued)

FOREIGN PATENT DOCUMENTS

EP 0 409 998 B1 11/1995

(Continued)

OTHER PUBLICATIONS

Snow, Laser Triangulation Sensors in the Tire Industry, LMI Selcom, undated (5 pgs.).

(Continued)

*Primary Examiner*—Kevin L Lee
(74) *Attorney, Agent, or Firm*—Edgar A. Zarins; Nirav D. Parikh; Baker & Daniels LLP

(57) ABSTRACT

A valve body assembly including a valve member coupled to a handle for adjusting the position of the valve member. The valve assembly includes a sensor for detecting the position of the valve member to determine whether the handle is in an OFF position and/or an ON position.

33 Claims, 18 Drawing Sheets

U.S. PATENT DOCUMENTS

| | | | |
|---|---|---|---|
| 5,547,020 A * | 8/1996 | Sable et al. | 166/65.1 |
| 5,549,273 A | 8/1996 | Aharon | |
| 5,566,702 A | 10/1996 | Philipp | |
| 5,570,869 A | 11/1996 | Diaz et al. | |
| 5,592,971 A | 1/1997 | Knapp | |
| 5,758,688 A | 6/1998 | Hamanaka et al. | |
| 5,781,942 A | 7/1998 | Allen et al. | |
| 5,810,050 A | 9/1998 | Pickerrell et al. | |
| 5,893,387 A | 4/1999 | Paterson et al. | |
| 5,918,855 A | 7/1999 | Hamanaka et al. | |
| 5,966,753 A | 10/1999 | Gauthier et al. | |
| 5,979,500 A | 11/1999 | Jahrling et al. | |
| 6,003,170 A | 12/1999 | Humpert et al. | |
| 6,058,967 A * | 5/2000 | Welker et al. | 137/554 |
| 6,127,671 A | 10/2000 | Parsons et al. | |
| 6,135,146 A | 10/2000 | Koganezawa et al. | |
| 6,161,814 A | 12/2000 | Jahrling | |
| 6,192,530 B1 | 2/2001 | Dai | |
| 6,202,980 B1 | 3/2001 | Vincent et al. | |
| 6,244,296 B1 | 6/2001 | Lafler et al. | |
| 6,273,394 B1 | 8/2001 | Vincent et al. | |
| 6,340,032 B1 | 1/2002 | Zosimadis | |
| 6,341,389 B2 | 1/2002 | Philipps-Liebich et al. | |
| 6,363,549 B2 | 4/2002 | Humpert et al. | |
| 6,393,634 B1 | 5/2002 | Kodaira et al. | |
| 6,394,133 B1 | 5/2002 | Knapp | |
| RE37,888 E | 10/2002 | Cretu-Petra | |
| 6,484,751 B2 * | 11/2002 | Lafler et al. | 137/554 |
| 6,513,787 B1 | 2/2003 | Jeromson et al. | |
| 6,639,209 B1 | 10/2003 | Patterson et al. | |
| 6,691,340 B2 | 2/2004 | Honda et al. | |
| 6,768,103 B2 | 7/2004 | Watson | |
| 6,770,869 B2 | 8/2004 | Patterson et al. | |
| 6,956,498 B1 | 10/2005 | Gauthier et al. | |
| 6,959,837 B2 * | 11/2005 | Shermer et al. | 137/553 |
| 6,962,168 B2 | 11/2005 | McDaniel et al. | |
| 6,964,404 B2 | 11/2005 | Patterson et al. | |
| 6,968,860 B1 | 11/2005 | Haenlein et al. | |
| 6,985,239 B2 | 1/2006 | Doucet et al. | |
| 6,996,863 B2 | 2/2006 | Kaneko | |
| 2001/0011390 A1 | 8/2001 | Humpert et al. | |
| 2004/0084609 A1 | 5/2004 | Bailey | |
| 2004/0104340 A1 | 6/2004 | Watson | |
| 2004/0187954 A1 | 9/2004 | Shermer et al. | |
| 2005/0127313 A1 | 6/2005 | Watson | |
| 2005/0150556 A1 | 7/2005 | Jonte | |
| 2005/0151101 A1 | 7/2005 | McDaniel et al. | |

FOREIGN PATENT DOCUMENTS

| | | |
|---|---|---|
| EP | 1 132 530 A2 | 9/2001 |
| EP | 0 685 604 B1 | 3/2003 |
| GB | 2 264 557 | 9/1993 |
| WO | WO 97/47828 | 12/1997 |
| WO | WP 99/61938 | 12/1999 |
| WO | WO 01/20204 | 3/2001 |

OTHER PUBLICATIONS

Grimmett, Flexible Application-Oriented Photoelectric Sensors: The Latest Technologies and Implementation, Omron Electronics LLC, Sep. 1, 2002 (2 pgs.).

Kennedy, The Basics of Triangulation Sensors, CyberOptics Corp., undated (7 pgs.).

Sharp Corporation, Device Specification for 8 bit output distance measuring sensor, Model GP3Y0E001k0F. SPEC. No. ED-04-G112, Issue Oct. 16, 2004 (10 pgs.).

* cited by examiner

VALVE BODY ASSEMBLY WITH ELECTRONIC SWITCHING

CROSS-REFERENCE TO RELATED APPLICATIONS

This application is a continuation-in-part of U.S. patent application Ser. No. 10/755,581, filed Jan. 12, 2004, now U.S. Pat. No. 7,150,293 and further claims the benefit of U.S. Provisional Application No. 60/662,106, filed Mar. 14, 2005, the disclosures of which are expressly incorporated by reference herein.

This application also expressly incorporates by reference the disclosure of each of the following applications: (1) U.S. patent application Ser. No. 10/755,582, filed Jan. 12, 2004, titled "CONTROL ARRANGEMENT FOR AN AUTOMATIC RESIDENTIAL FAUCET," (2) U.S. patent application Ser. No. 10/757,316, filed Jan. 14, 2004, now U.S. Pat. No. 6,962,168, titled "CAPACITIVE TOUCH ON/OFF CONTROL FOR AN AUTOMATIC RESIDENTIAL FAUCET," (3) U.S. patent application Ser. No. 10/912,254, filed Aug. 5, 2004, now U.S. Pat. No. 6,968,860, titled "RESTRICTED FLOW HANDS-FREE FAUCET," (4) U.S. Provisional Patent Application Ser. No. 60/661,981, filed Mar. 14, 2005, titled "BATTERY BOX ASSEMBLY," (5) U.S. Provisional Patent Application Ser. No. 60/661,982, filed Mar. 14, 2005, titled "POSITION-SENSING DETECTOR ARRANGEMENT FOR CONTROLLING A FAUCET," and (6) U.S. Provisional Patent Application Ser. No. 60/662,107, filed Mar. 14, 2005, titled "SPOUT ASSEMBLY FOR AN ELECTRONIC FAUCET AND METHOD FOR PROVIDING STRAIN RELIEF OF A CABLE" ("Related Applications"). It is understood that certain features disclosed and/or claimed in one or more of the Related Applications may be combined and/or claimed in combination with certain features disclosed in this application.

BACKGROUND AND SUMMARY OF THE INVENTION

The present invention generally relates to automatic faucets, and more particularly to a valve body assembly for an automatic faucet that facilitates electronic switching.

Automatic faucets are desirable because, among other things, they reduce water consumption and can avoid damage resulting from overflow conditions if water is left running indefinitely. Moreover, hands-free operation of faucets is convenient and permits the user to avoid touching or grasping the faucet with dirty hands.

According to an illustrative embodiment of the present disclosure, a valve assembly is provided for use with an electronic faucet. The valve assembly includes the valve housing having a cavity, and a magnetic field sensor supported by the valve housing. A valve member is disposed within the cavity and includes a magnet. The valve member is movable between a first position relative to the sensor to generate a first signal, and a second position relative to the sensor to generate a second signal. The magnet is positioned further from the sensor when the valve member is in the second position than when the valve member is in the first position.

According to a further illustrative embodiment of the present disclosure, an electronic faucet assembly includes a water inlet conduit, a delivery spout, and a valve body in fluid communication with the water inlet conduit and the delivery spout. A manual valve member is supported by the valve body and is configured to move between an open position and a closed position for controlling fluid flow from the water inlet conduit to the delivery spout. A sensing element is supported by the manual valve member and is configured to move with the manual valve member. A position sensor is located in spaced relation to the sensing element and is configured to detect the relative position of the sensing element and in response thereto provide a signal indicative of the position of the manual valve member. An actuator driven valve is in further communication with the manual valve member. A proximity sensor having a detection zone is configured to generate a proximity signal when the proximity sensor detects the presence of an object within the detection zone. A controller is in electrical communication with the position sensor, the actuator driven valve, and the proximity sensor. The controller being configured to deactivate the proximity sensor when the position sensor indicates that the manual valve member is in the closed position.

According to another illustrative embodiment of the present disclosure, a valve assembly is provided for use with an electronic faucet. The valve assembly includes a valve housing having a cavity, and a movable valve member disposed within the cavity. The valve member includes a ball having a hot water inlet, a cold water inlet, a mixed water outlet, and a connecting passageway providing fluid communication between the hot water inlet, the cold water inlet, and the mixed water outlet. A holder is supported within the connecting passageway of the ball. A magnet is operably coupled to the holder.

According to yet another illustrative embodiment of the present disclosure, a valve assembly is provided for use with an electronic faucet. The valve assembly includes a valve housing, and a valve member received within the housing and movable between a closed position and an open position. A magnetic field sensor is configured to detect when the valve member is closed.

According to further illustrative embodiment of the present disclosure, a valve body assembly is provided for use with an automatic faucet and is configured to attach to a sink deck. The valve body assembly includes a valve assembly, an outer sleeve configured to substantially cover the valve assembly, and a handle assembly coupled to the valve assembly. A gasket is configured to electrically isolate the valve assembly, the outer sleeve, and the handle assembly from the sink deck.

According to yet another illustrative embodiment of the present disclosure, a valve body assembly is provided for use with a faucet. The valve body assembly includes a valve housing including a cavity, and a valve member disposed within the cavity. A trim dome is operably coupled to the valve member, and an outer sleeve is received around the valve housing. A seal is positioned intermediate the trim dome and the outer sleeve. The seal includes a gasket portion configured to provide a wear surface for the trim dome and an annular ring configured to provide a lip seal with the trim dome.

The features and advantages of the present invention described above, as well as additional features and advantages, will be readily apparent to those skilled in the art upon reference to the following description and the accompanying drawings.

BRIEF DESCRIPTION OF THE DRAWINGS

The detailed description of the drawings particularly refers to the accompanying figures in which.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
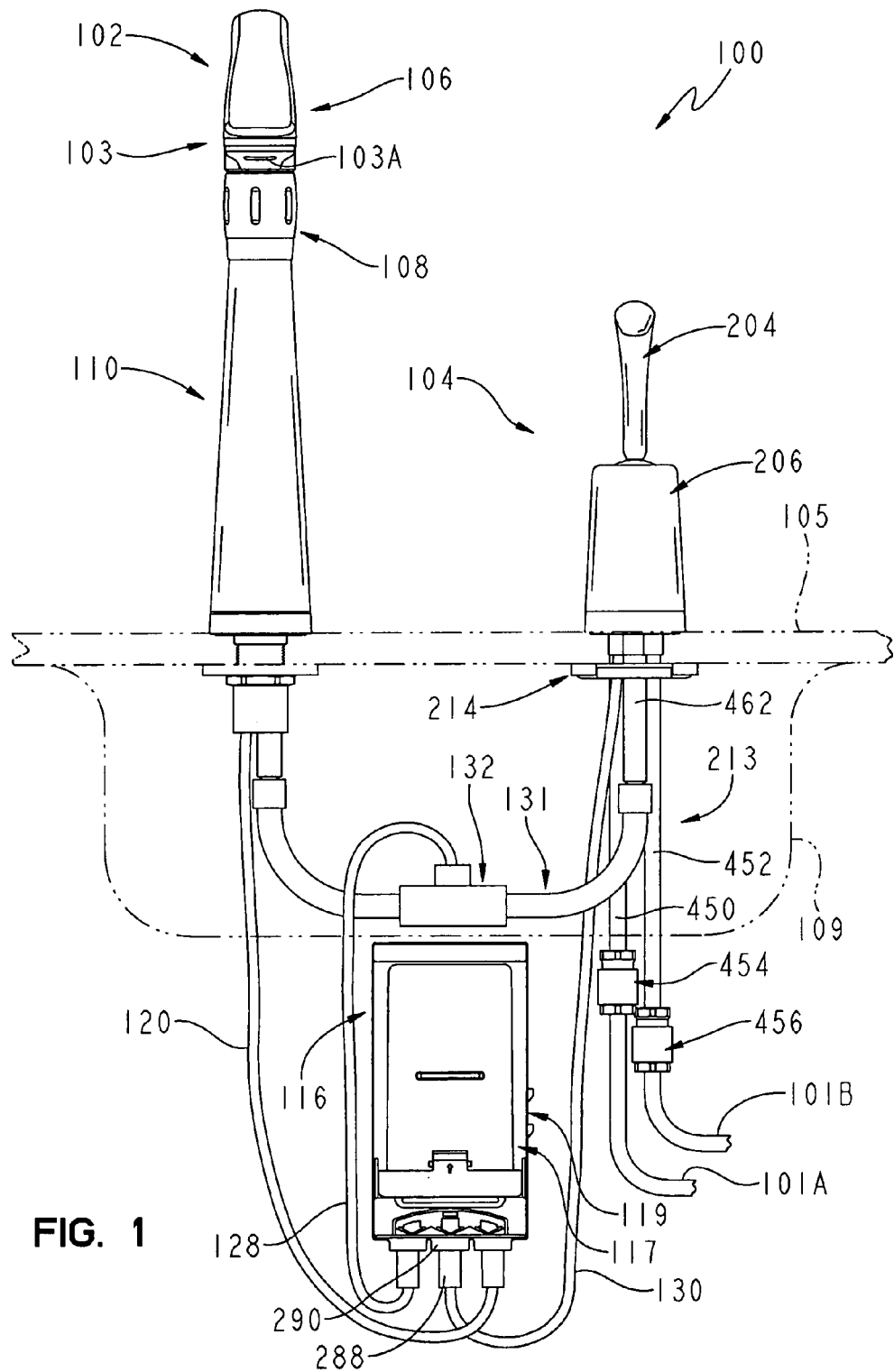
FIG. 1 is a front plan view of an illustrative embodiment electronic faucet system including a valve body assembly having an electrical cable extending therefrom to a controller assembly, and a spout assembly having an electrical cable extending therefrom to the controller assembly.
Figure 2:
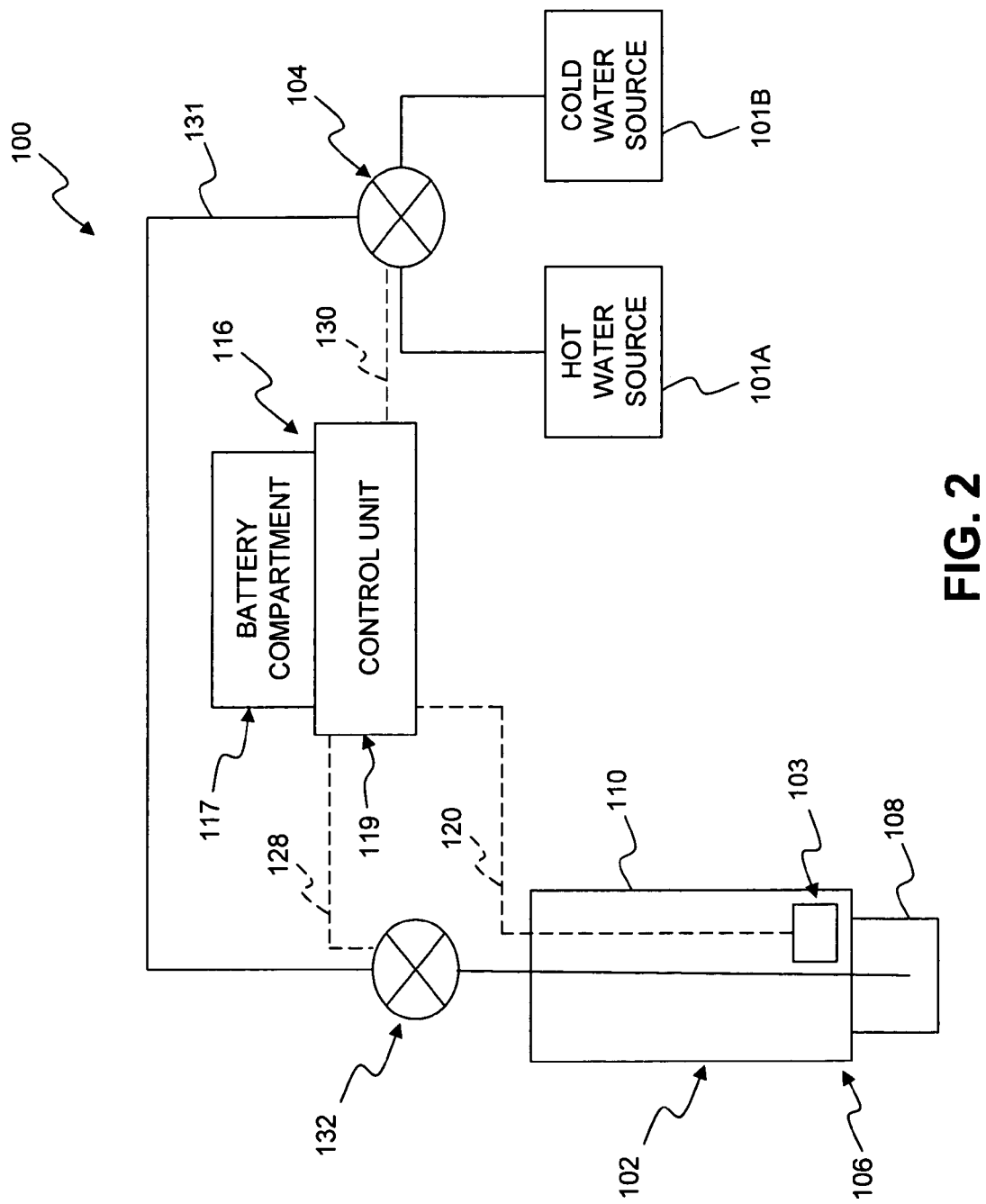
FIG. 2 is a block diagram illustrating the electronic faucet system of FIG. 1.

Referring initially to FIGS. 1 and 2, an illustrative electronic faucet system 100 is shown fluidly coupled to a hot water source 101A and a cold water source 101B. Faucet system 100 includes a spout assembly 102 and a valve body assembly 104 mounted to a sink deck 105. As explained in more detail herein and in one or more of the Related Applications, including U.S. Provisional Patent Application Ser. No. 60/661,982, filed Mar. 14, 2005, titled "POSITION-SENSING DETECTOR ARRANGEMENT FOR CONTROLLING A FAUCET," and Provisional Patent Application Ser. No. 60/662,107, filed Mar. 14, 2005, titled "SPOUT ASSEMBLY FOR AN ELECTRONIC FAUCET AND METHOD FOR PROVIDING STRAIN RELIEF OF A CABLE," the disclosures of which have been previously expressly incorporated by reference herein, spout assembly 102 illustratively includes several electronic sensors. More particularly, spout assembly 102 illustratively includes a sensor assembly 103 having an infrared sensor 103A generally in an upper portion 106 of spout assembly 102 to detect the presence of an object, such as a user's hands. Sensor assembly 103 further illustratively includes a Hall effect sensor (not shown) positioned in upper portion 106 to detect when a pull-out or pull-down spray head 108 is spaced apart from upper portion 106, for example when a user is directing water flow to desired objects within a sink basin 109. Sensor assembly 103 additionally illustratively includes a capacitance touch sensor (not shown) wherein fluid flow from spout assembly 102 may be activated by the user touching spout assembly 102. Additional sensors or electronic devices may be positioned within or attached to spout assembly 102.

Due to the presence of electronics (such as the described sensors) generally within upper portion 106, a spout control electrical cable 120 is contained within a delivery spout 110 of spout assembly 102 and provides electrical communication between sensor assembly 103 and a controller 116. Illustratively, controller 116 includes a battery compartment 117 operably coupled to a control unit 119. Additional details of the controller 116 are provided in one or more of the Related Applications, including U.S. Provisional Patent Application Ser. No. 60/661,981, filed Mar. 14, 2005, titled "BATTERY BOX ASSEMBLY," the disclosure of which has been previously expressly incorporated by reference herein. It should be understood, however, that in alternate embodiments, control unit 119 may be powered by AC power or DC power from an AC to DC converter.

Valve body assembly 104 also illustratively includes several sensors as explained in more detail herein. Valve body assembly 104 illustratively includes a manual valve member 202 (FIG. 4) to provide for the manual control of the flow and temperature of water in response to manual manipulation of a handle 204 supported for movement relative to a holder or outer sleeve 206. A position sensor 208 (FIG. 12) is illustratively positioned in outer sleeve 206 to detect a position of the manual valve member 202, and hence, the handle 204. Valve body assembly 104 further illustratively includes a capacitance touch sensor 210 (FIG. 12) wherein fluid flow from spout assembly 102 may be activated by the user touching valve body assembly 104. Additional sensors or electronic devices may be positioned within or attached to valve body assembly 104. Due to the presence of electronics (such as the described sensors) generally within outer sleeve 206, a valve control electrical cable 130 is contained within outer sleeve 206 and provides electrical communication with controller 116.

With further reference to FIG. 2, the faucet system 100 is in fluid communication with hot water source 101A and cold water source 101B. The valve body assembly 104 illustratively mixes hot water from the hot water source 101A and cold water from the cold water source 101B to supply a mixed water to an actuator driven valve 132 through a mixed water conduit 131. Illustratively, the actuator driven valve 132 comprises a conventional magnetically latching solenoid valve of the type available from R.P.E. of Italy. The actuator driven valve 132 is controlled by the controller 116 through an electrical cable 128 and, as such, controls the flow of mixed water supplied to the spout assembly 102. As shown in FIGS. 1 and 2, the valves 104 and 132 are arranged in series and are fluidly coupled by mixed water conduit 131. The spout assembly 102 is configured to dispense mixed water through spray head 108 and into conventional sink basin 109.

As shown in FIGS. 1 and 2, when the actuator driven valve 132 is open, the faucet system 100 may be operated in a conventional manner, i.e., in a manual control mode through operation of the handle 204 and the manual valve member 202 of valve body assembly 104. Conversely, when the manually controlled valve body assembly 104 is set to select a water temperature and flow rate, the actuator driven valve 132 can be touch controlled, or activated by proximity sensors when an object (such as a user's hands) are within a detection zone to toggle water flow on and off.

In an illustrative embodiment, the actuator driven valve 132 is controlled by electronic circuitry within control unit 119 that implements logical control of the faucet assembly 100. This logical control includes at least two functional modes: a manual mode, wherein the actuator driven valve 132 remains open, and a hands-free mode, wherein the actuator driven valve 132 is toggled in response to signals from a proximity sensor. Thus, in the manual mode, the faucet assembly 100 is controlled by the position of the handle 204 in a manner similar to a conventional faucet, while in the hands-free mode, the flow is toggled on and off in response to the proximity sensor (while the flow temperature and rate are still controlled by the handle 204 position).

Illustratively, the faucet assembly 100 is set to operate in a hands-free mode by user interaction, for example by input from a push-button, by input from a strain gauge or a piezoelectric sensor incorporated into a portion of the faucet assembly 100, such as the spout assembly 102, or by input from a capacitive touch button or other capacitive touch detector. It will be appreciated that a touch control, whether implemented with a strain gauge or a capacitive touch sensor can respond to contact between a user and the handle 204 that is insufficient to change a position of the handle 204.

The capacitive touch control may be incorporated into the spout assembly 102 of the faucet assembly 100, as taught by U.S. Pat. No. 6,962,168, titled "CAPACITIVE TOUCH ON/OFF CONTROL FOR AN AUTOMATIC RESIDENTIAL FAUCET," the disclosure of which has been previously expressly incorporated by reference herein. In certain illustrative embodiments, the same mode-selector can be used to return the faucet assembly 100 from hands-free mode to manual mode. In certain of these illustrative embodiments, as detailed herein, a touch-sensor is also incorporated into the handle 204. In such illustrative embodiments, the two touch controls can either operate independently (i.e. mode can be changed by touching either one of the touch controls), or together, so that the mode is changed only when both touch controls are simultaneously touched.

In certain alternative embodiments, once placed in hands-free mode the faucet assembly 100 can be returned to manual mode simply by returning the manual faucet control handle 204 to a closed position. In addition, in certain illustrative embodiments the faucet assembly 100 returns to manual mode after some period of time, such as 20 minutes, without user intervention. This time-out feature may be useful for applications in which power is supplied by batteries, because it preserves battery life. In one illustrative embodiment, once the hands-free mode is activated, the actuator driven valve 132 is closed, stopping the water flow. This state is the hands-free standby state, in which water flow will be activated by a proximity detector. The manual valve handle 204 preferably remains in the open position. In other words, the manual valve body assembly 104 remains open, so that flow is halted only by the actuator driven valve 132.

In the hands-free standby state, objects positioned within the sensor's trigger zone cause the faucet assembly 100 to enter the hands-free active state, wherein the actuator driven valve 132 is opened, thus permitting the water to flow. The faucet assembly 100 remains in hands-free active mode, and the actuator driven valve 132 remains open, as long as objects are detected within the sensor's trigger zone. When objects are no longer detected in the sensor's trigger zone, the faucet assembly 100 returns to hands-free standby mode, and the actuator driven valve 132 closes.

It will be appreciated that water flow is important while a user is attempting to adjust the flow rate or temperature. More particularly, the user observes these properties as they are adjusted, in effect completing a feedback loop. Thus, adjustment of the flow properties is another case in which water flow is preferably activated without requiring the user to place his or her hands or an object in the trigger zone. Therefore, in the illustrative embodiment, when the faucet assembly 100 is in standby hands-free mode, the faucet assembly 100 switches to active hands-free mode, and the actuator driven valve 132 is opened, whenever the manual control handle 204 is touched.

In certain alternative embodiments, when the handle 204 is touched while in hands-free mode, the faucet assembly 100 switches to manual mode, which will, of course, also result in activating the water flow (unless the handle is closed), as well as the deactivation of the proximity sensor. If the user wishes to then return to hands-free mode, he or she may reactivate it in the usual way, such as by a touch control.

In the illustrative embodiment, the faucet assembly 100 does not immediately enter the hands-free mode when the manual valve body assembly 104 is opened and released. Instead, the faucet assembly 100 enters a "quasi-hands-free" state, in which the faucet assembly 100 continues to be manually controlled, and the actuator driven valve 132 remains open. This quasi-hands-free state persists as long as the proximity sensor does not detect the presence of an object within the sensor's trigger zone. This allows the faucet assembly 100 to function as a normal manual valve when initially operated, but to switch modes to hands-free automatically when sensing the presence of an object within the trigger zone. The advantage of this quasi-hands-free mode is that the faucet assembly 100 can be operated as a conventional manual faucet without the necessity of manually selecting the manual mode. This is valuable, for example, in single-use activations such as getting a glass of water or when guests use the faucet assembly 100. In these embodiments, when the user initially opens the faucet assembly 100 and adjusts the water temperature or flow rate and then releases the handle 204, the water does not immediately shut off, thereby frustrating the user's attempt to operate the faucet assembly 100 as a manual faucet. After the user has adjusted the flow, and places an object within the faucet assembly's detection zone, the faucet assembly 100 will then enter hands-free mode.

Because the behavior of the faucet assembly 100 in response to its various input devices is a function of the mode it is presently in, illustratively, the faucet assembly 100 includes some type of low-power indicator to identify it's current mode. Appropriate indicators include LEDs (light emitting diodes), LCDs (liquid crystal displays), or a magnetically latching mechanical indicator. In certain embodiments, the mode indicator may simply be a single bit indicator (such as a single LED) that is activated when the faucet assembly 100 is in hands-free mode. Alternatively, the mode indicator may include a separate bit display for each possible mode. In still other embodiments, the mode indicator may indicate mode in some other way, such as a multi-color LED, in which one color indicates hands-free mode, and one or more other colors indicate other modes. Additional details regarding the mode indicator are provide herein. Further, transition between modes may illustratively be indicated by an audio output.

When a user is finished using the faucet assembly 100, the faucet assembly 100 is illustratively powered down and returned to a baseline state. Powering down provides power savings, which makes it more feasible to operate the faucet assembly 100 from battery power. Returning the faucet assembly 100 to a baseline state is helpful because it gives predictable behavior when the user first begins using the faucet assembly 100 in a particular period of operation. Preferably, the baseline state is the manual mode, since the next user of the faucet assembly 100 might not be familiar with the hands-free operation. Illustratively, a user is able to power down the faucet assembly 100 and return it to the manual, baseline mode simply by returning the manual handle 204 to the closed position, because this is a reflexive and intuitive action for users. As a consequence, the illustrative embodiment faucet assembly 100 is configured to sense whether the handle 204 is in the closed position.

Illustratively, the faucet assembly 100 also includes a "watchdog" timer, which automatically closes the actuator driven valve 132 after a certain period of time, in order to prevent overflowing or flooding. In certain of these illustrative embodiments, normal operation is resumed once an object is no longer detected in the sensor's trigger zone. In certain other illustrative embodiments, normal operation is resumed once the manual valve body assembly 104 is closed. In still other illustrative embodiments, normal operation is resumed in either event. In those illustrative embodiments including a hands-free mode indicator, the indicator is flashed, or otherwise controlled to indicate the time-out condition.

In addition to the various power-saving measures described above, the illustrative embodiment also includes an output mechanism that alerts users when batter power is low. It will be appreciated that any suitable output mechanism may be used, but illustratively an LED and an audio output are used.

Figure 3:
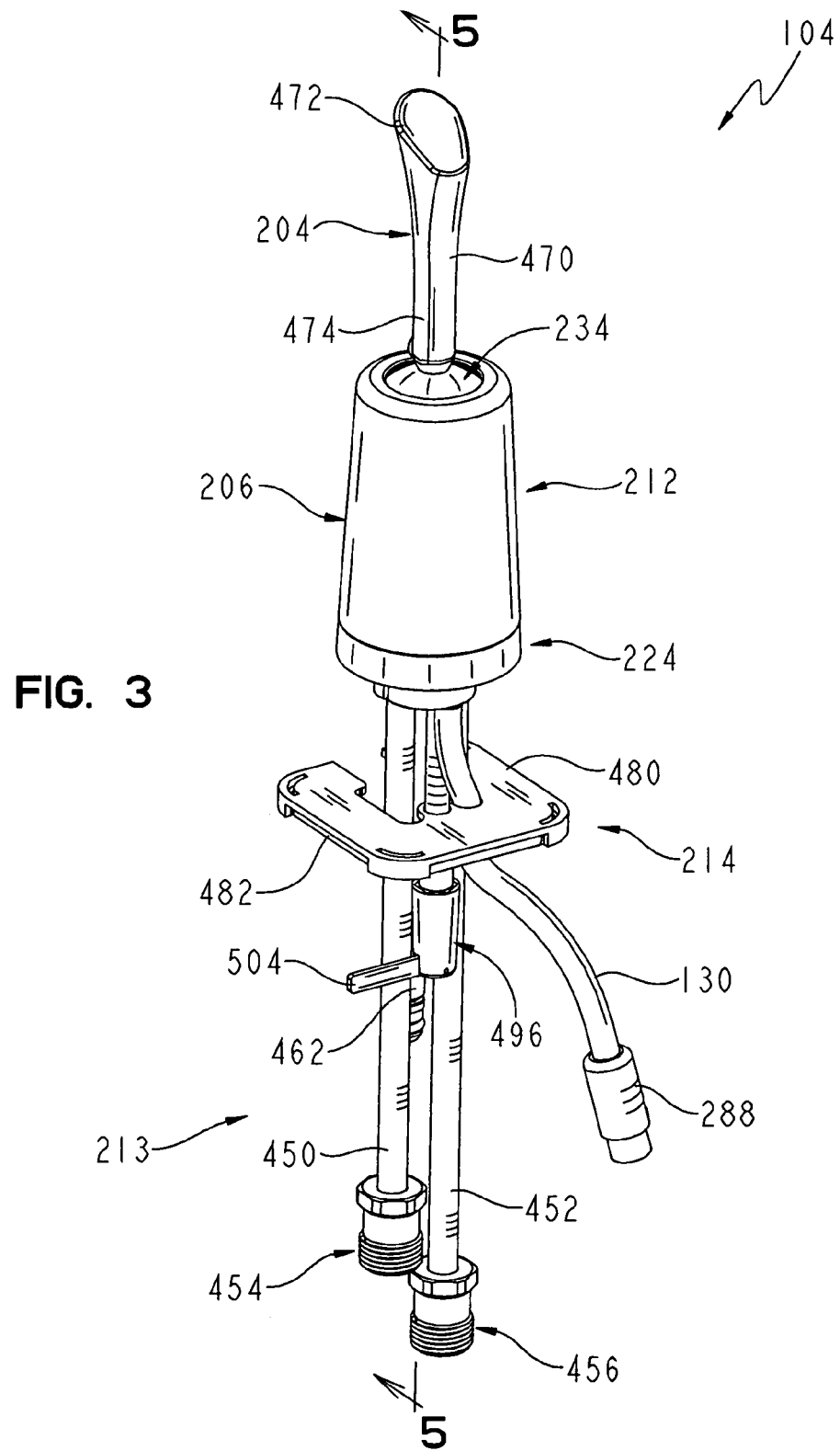
FIG. 3 is a perspective view of an illustrative embodiment valve or assembly.
Figure 4:
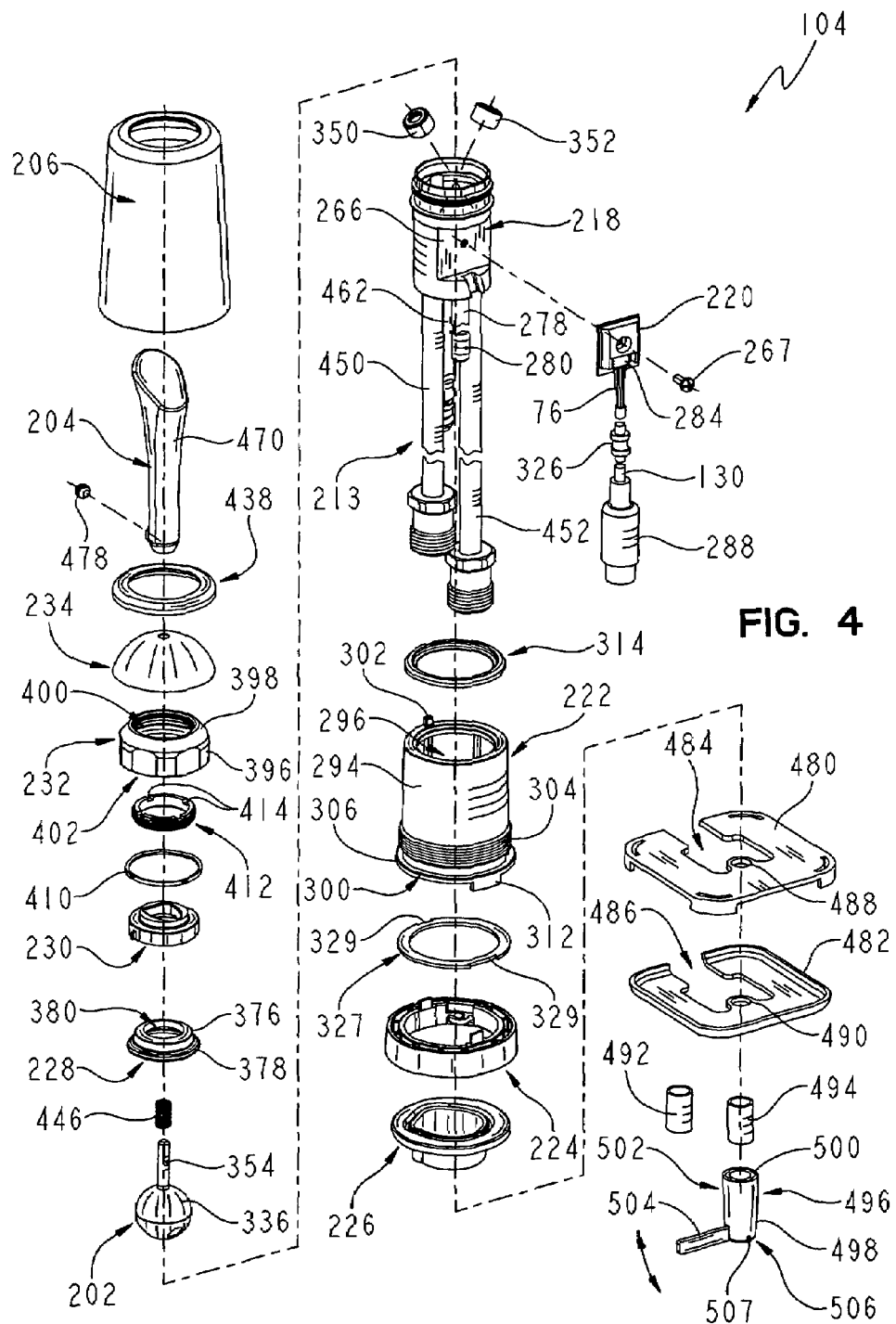
FIG. 4 is an exploded perspective view of the valve body assembly of FIG. 1.

Referring now to FIGS. 3 and 4, valve body assembly 104 according to one illustrative embodiment of the present invention generally includes a housing assembly 212 and a waterway assembly 213, configured to be coupled to sink deck 105 by a mounting assembly 214.

Figure 5:
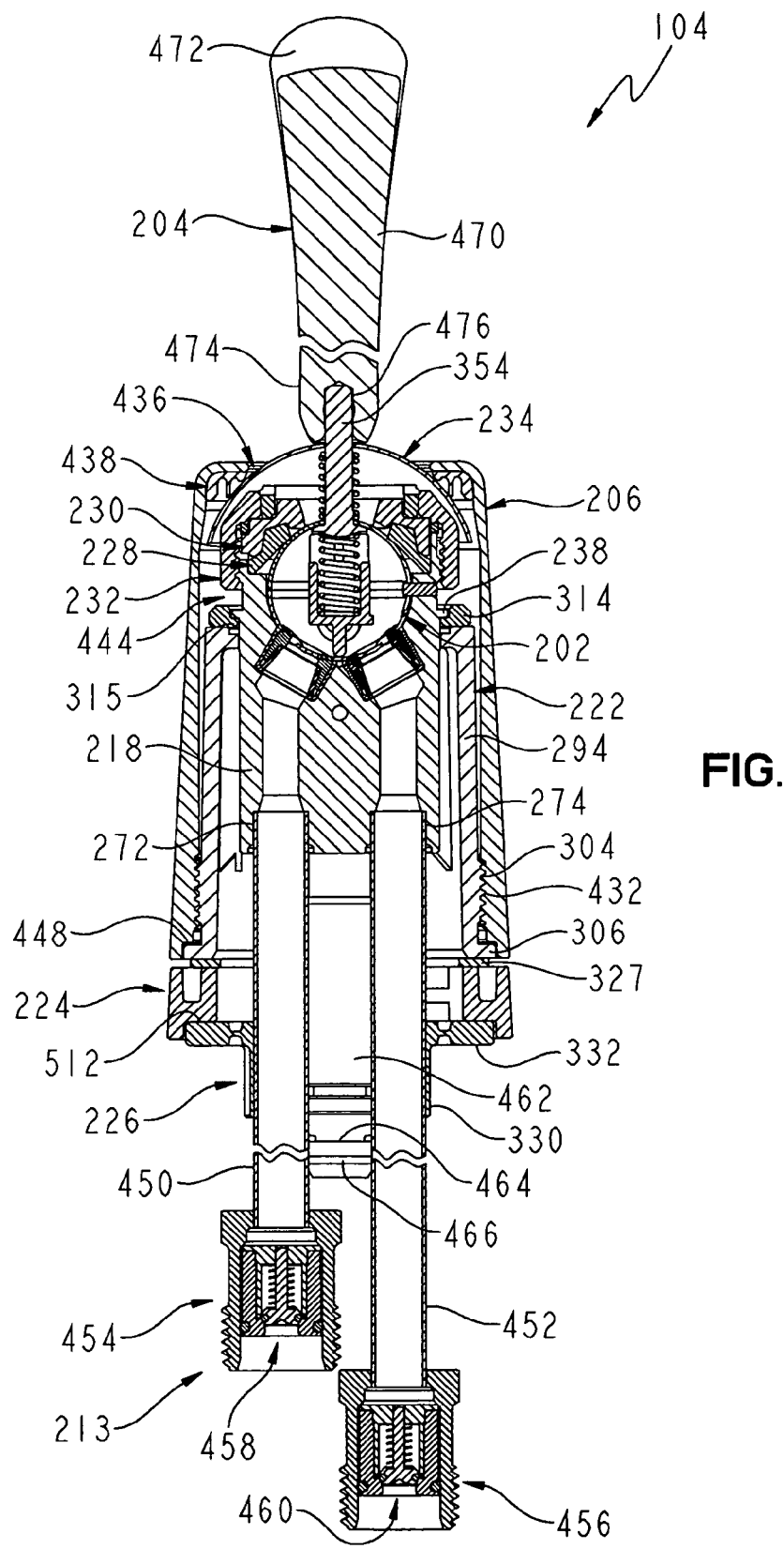
FIG. 5 is a cross-sectional view taken along line 5-5 of FIG. 1.

As shown in FIGS. 3 through 5, housing assembly 212 generally includes a metal valve housing 218, a printed circuit board (PCB) 220 attached to valve housing 218, an inner sleeve 222, a base 224, a gasket 226, valve member 202, a guide ring 228, a connector ring 230, a bonnet 232, a dome 234, and metallic outer sleeve 206.

Figure 6:
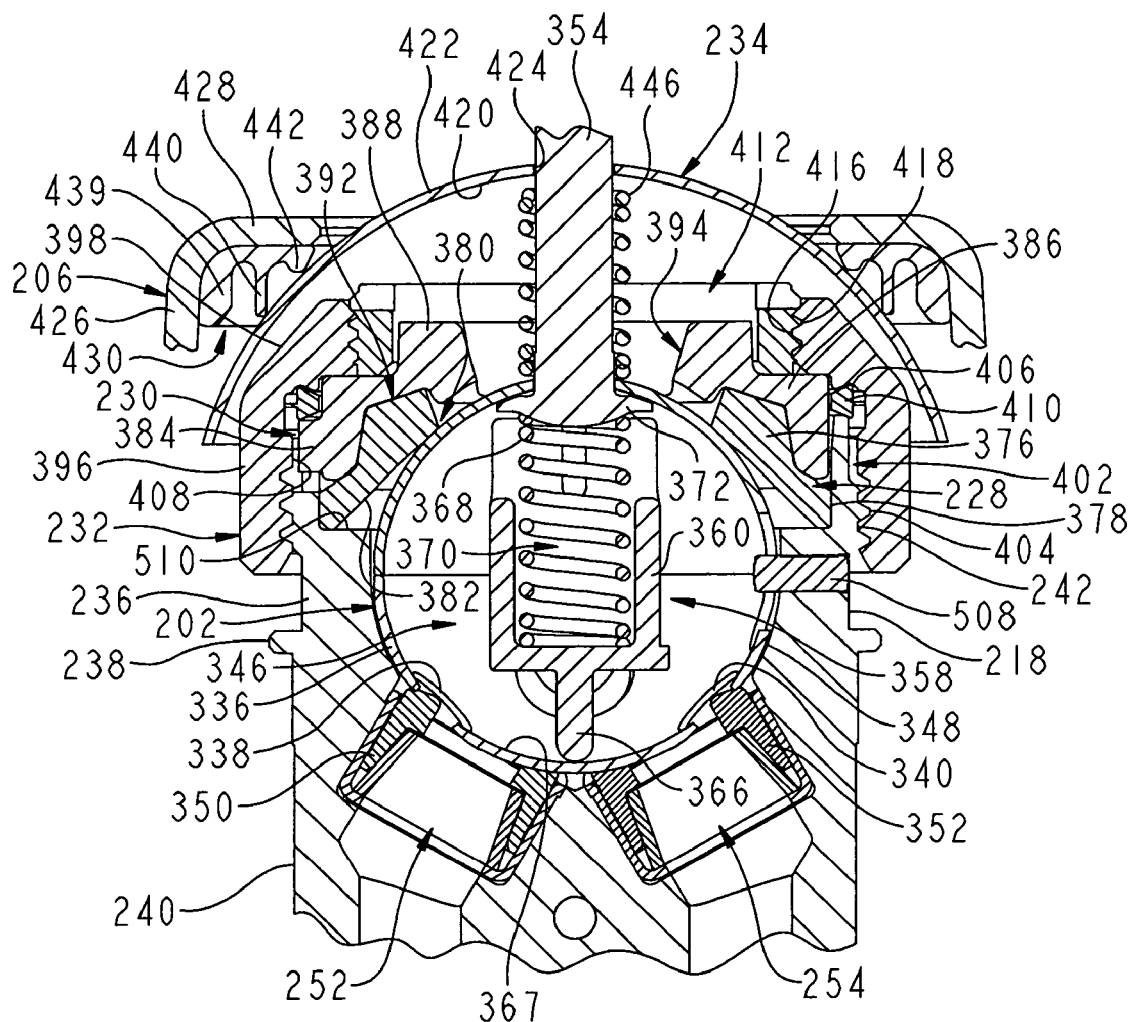
FIG. 6 is a detailed view of FIG. 5.
Figure 8:
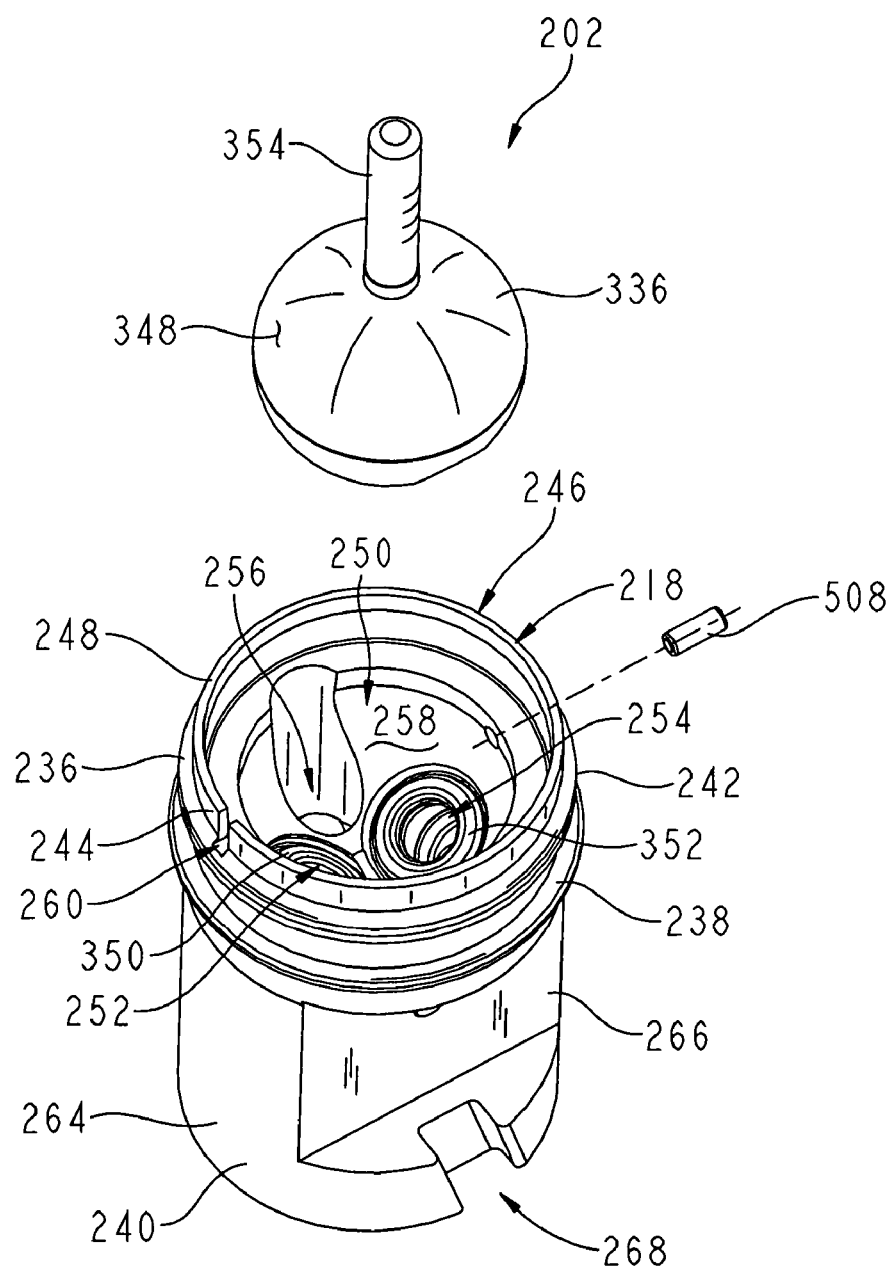
FIG. 8 is an exploded top perspective view of the valve member and the valve housing of FIG. 4.
Figure 9:
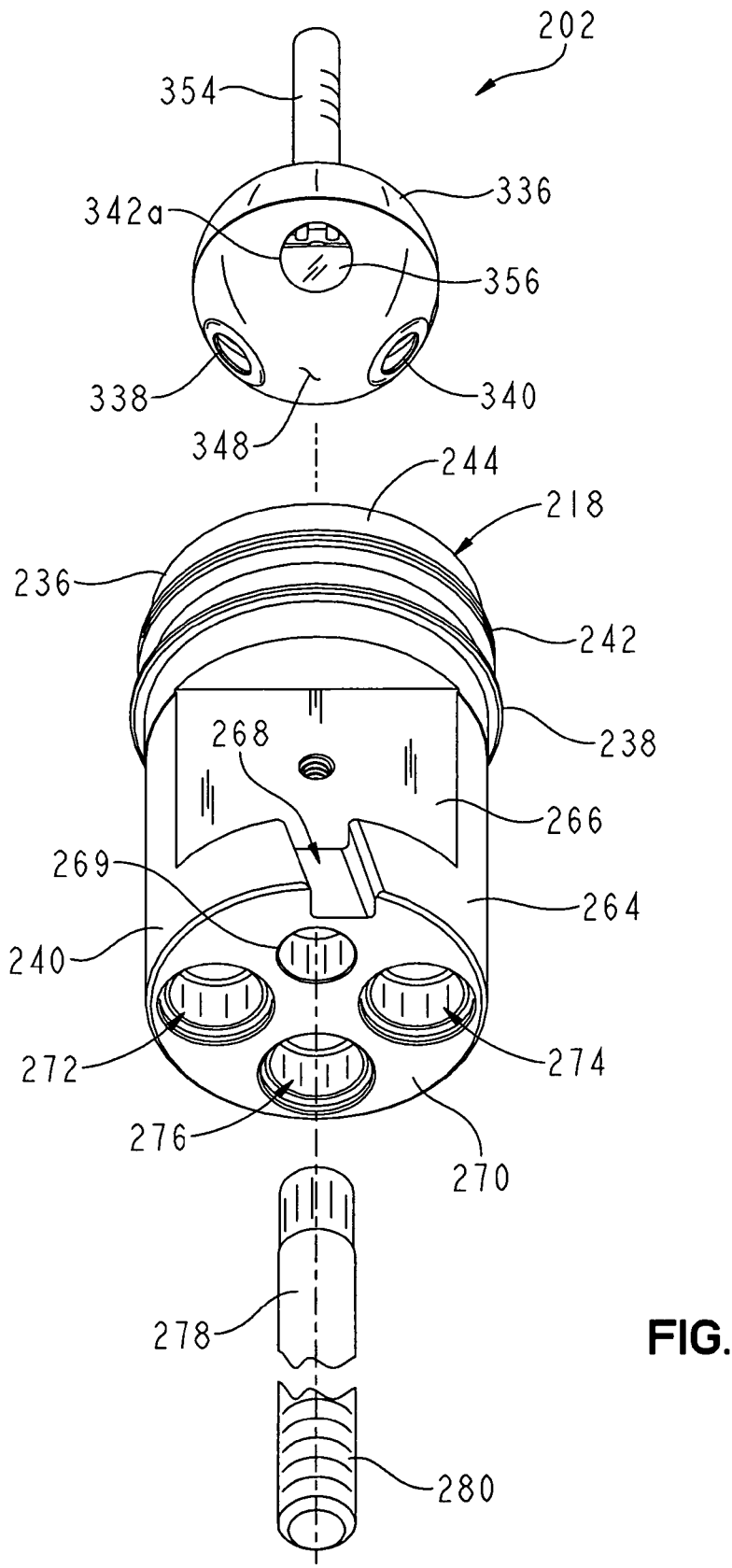
FIG. 9 is an exploded bottom perspective view of the valve member and the valve housing of FIG. 4.

With reference to FIGS. 6, 8, and 9, valve housing 218 includes an upper portion 236, a peripheral flange 238, and a lower portion 240. As shown in FIG. 8, upper portion 236 includes external threads 242 on a side wall 244 that terminates at an opening 246 defined by an edge 248. Opening 246 opens into a valve cavity 250 having a hot water inlet 252, a cold water inlet 254, and a mixed water outlet 256. As shown, the lower wall 258 of cavity 250 has a substantially spherical contour to facilitate valve adjustments using valve member 202 as is further described below. A notch 260 is formed in side wall 244, extending from edge 248 toward threads 242, for receiving a portion of connector ring 230 as is further described below. Lower portion 240 includes a substantially cylindrical side wall 264 having a flat section 266 for receiving PCB 220. Illustratively a conventional fastener, such as screw 267 couples PCB 220 to flat section 266. A groove 268 is formed in side wall 264 to permit routing of cable 130 to PCB 220 as is further described below. Lower portion 240 also includes a lower wall 270 having a hot water opening 272, which is in fluid communication with hot water inlet 252, a cold water opening 274, which is in fluid communication with cold water inlet 254, and an outlet opening 276, which is in fluid communication with outlet 256. An attachment post 278 is fixedly attached to lower wall 270, and includes a threaded portion 280 (FIG. 9).

Figure 12:
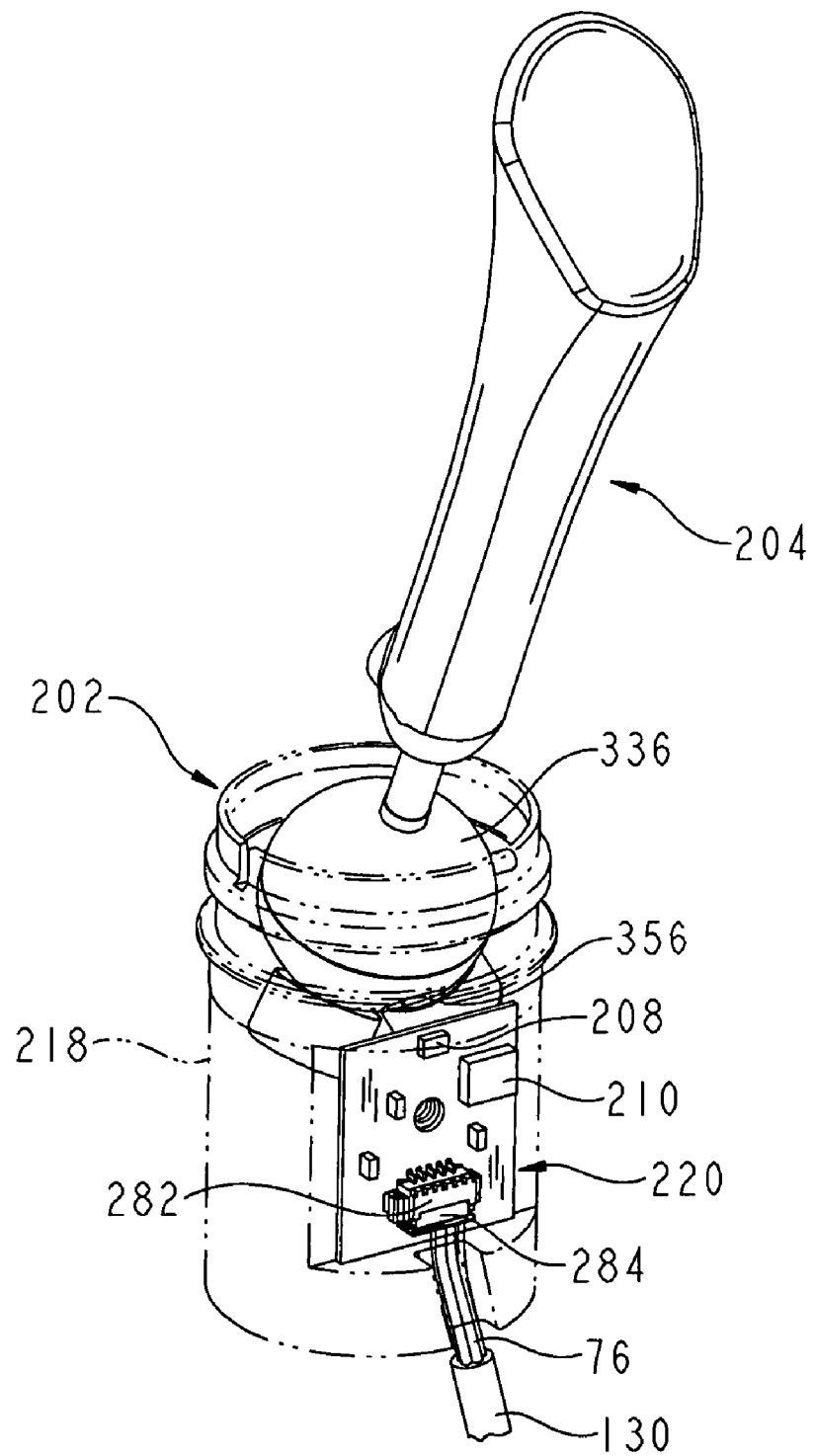
FIG. 12 is a perspective view of the valve member, the handle, and the valve housing of FIG. 4, showing the valve member in an OFF position.
Figure 19:
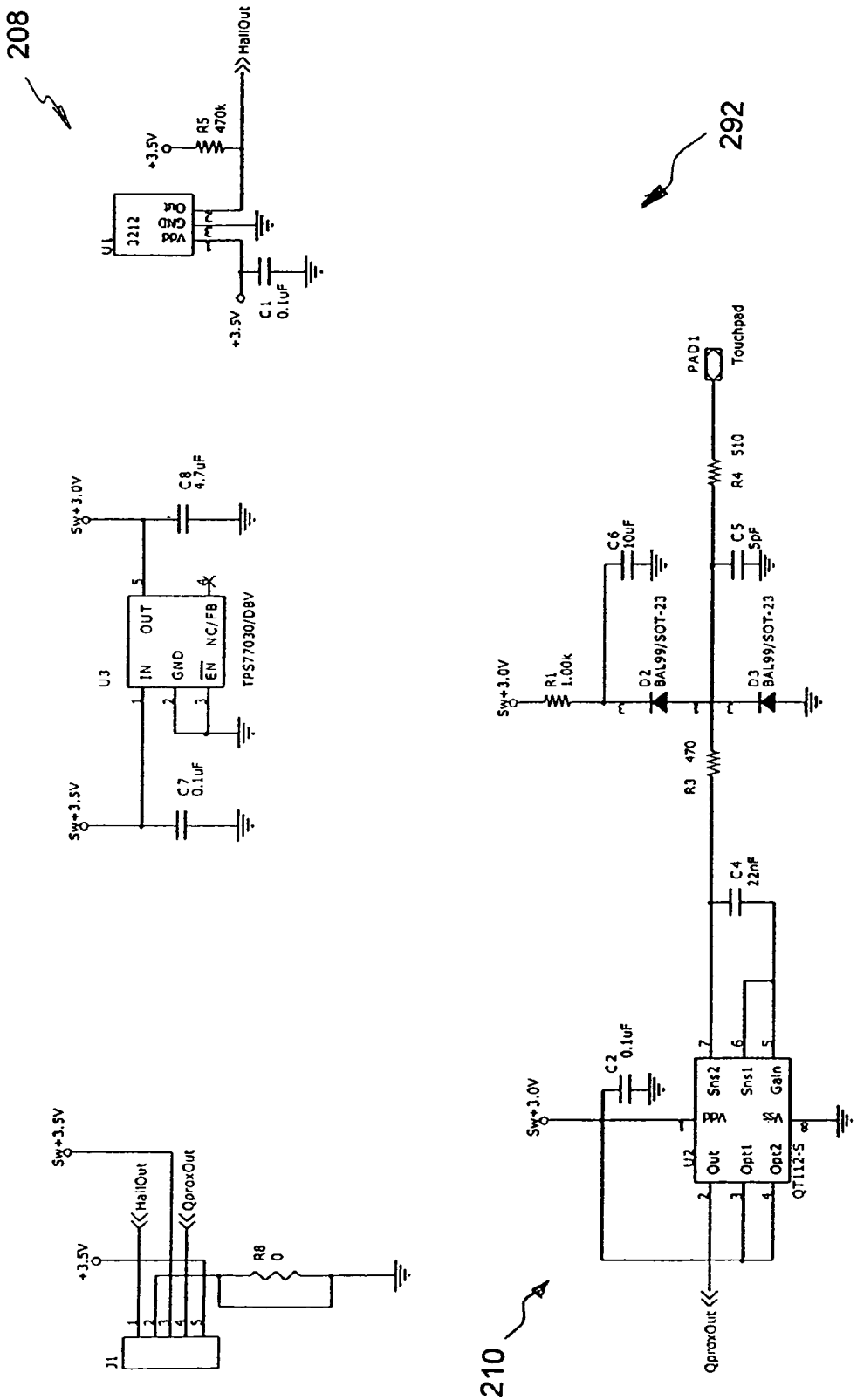
FIG. 19 is a schematic diagram of the electronics for detecting the position of the valve member of FIGS. 12 and 13 and for detecting contact of a user with the handle assembly or the outer sleeve of FIG. 4.

With reference to FIGS. 4 and 12, PCB 220 includes a connector 282 for mating with a connector 284 attached to one end of cable 130. Cable 130 includes a plurality of conductors 286 that extend through cable 130 to a plug 288, which mates with a receptacle 290 of control unit 119 (FIG. 1). PCB 220 further includes electronics 292 including capacitance touch sensor 210 configured to sense human contact with certain portions valve body assembly 104, and position sensor 208 configured to sense the position of valve member 202 and handle 204. Sensors 210 and 208 provide signals via cable 130 indicating contact and handle position as is further described below. A schematic of electronics 292 is depicted in FIG. 19.

Figure 15:
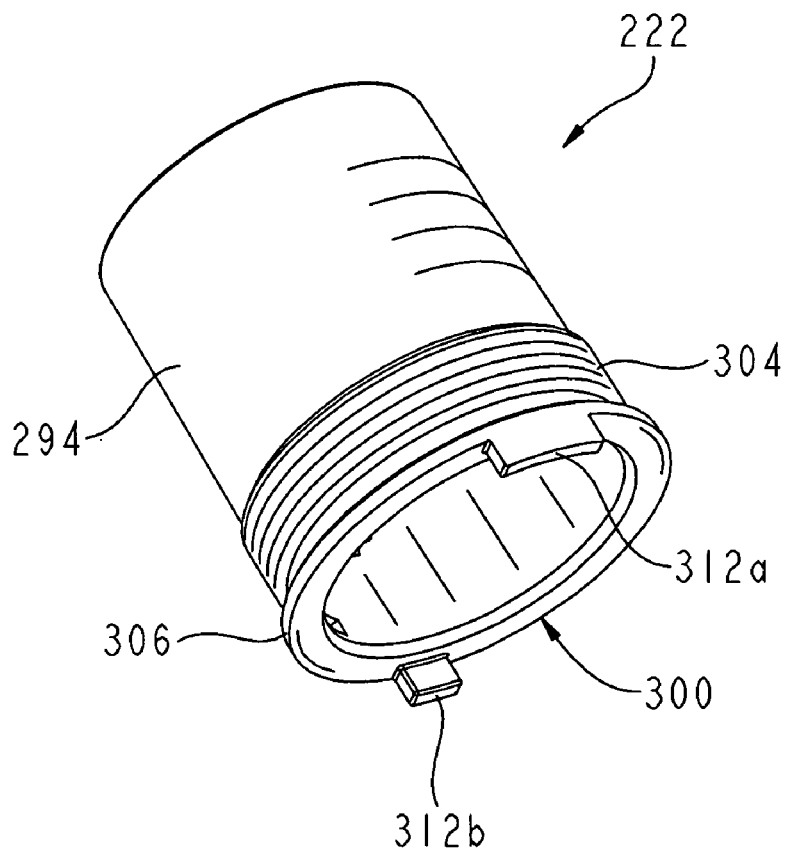
FIG. 15 is a perspective view of the inner sleeve of FIG. 4.
Figure 16:
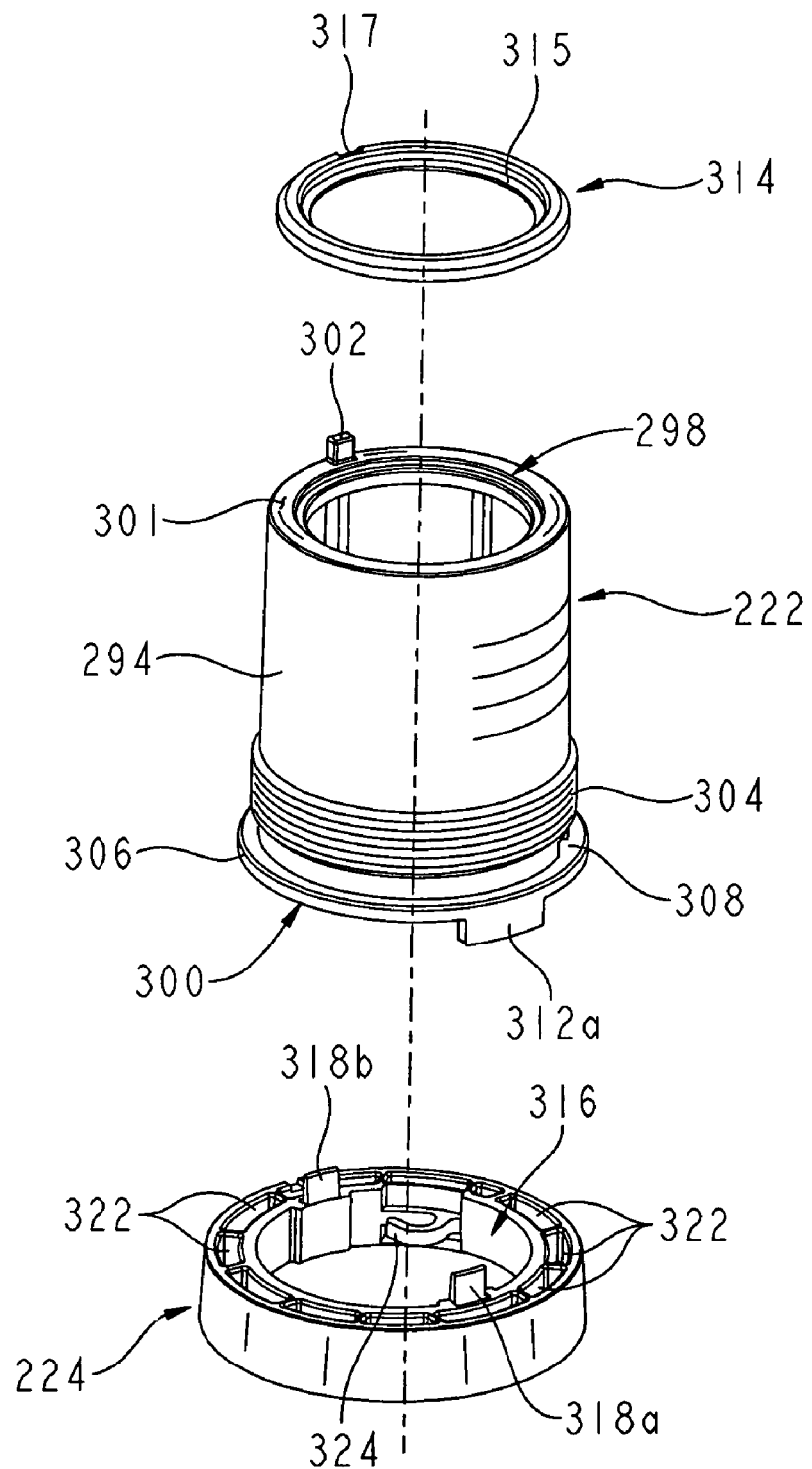
FIG. 16 is a perspective view of the base, the inner sleeve, and the spacer of FIG. 4.

With reference to FIGS. 4, 5, 15, and 16, inner sleeve 222 includes a substantially cylindrical side wall 294 that defines an interior space 296, an upper opening 298, and a lower opening 300. Extending from an upper surface 301 of side wall 294 adjacent upper opening 298 is a tab 302 (FIG. 16) for aligning and keying sleeve 222 to valve housing 218 as is further described below. External threads 304 extend around side wall 294 adjacent lower opening 300, and a radially projecting flange 306 extends from side wall 294 at lower opening 300. A pair of diametrically opposed openings 308 (only opening 308 is shown in FIG. 16) extend through side wall 294 between flange 306 and threads 304. As shown in FIG. 15, a first alignment tab 312a and a second alignment tab 312b extend from flange 306 toward base 224. First alignment tab 312a has an arcuate length that is different from the arcuate length of second alignment tab 312b to permit mating of inner sleeve 222 and base 224 in only one relative orientation.

As shown in FIGS. 4, 5, and 16, an annular ring or spacer 314 is supported above upper surface 301 of inner sleeve 222. Spacer 314 includes a flange 315 which cooperates with flange 238 of valve housing 218 and is illustratively coupled thereto in a conventional manner, for example, through brazing. Illustratively, as shown in FIG. 16, a notch 317 is configured to receive tab 302 for orienting inner sleeve 222 with spacer 314 and, hence, with valve housing 218. While in the illustrative embodiment, spacer 314 is a separate component coupled to valve housing 218, it should be appreciated that in alternative embodiments, spacer 314 may be formed integral with valve housing 218.

Figure 7:
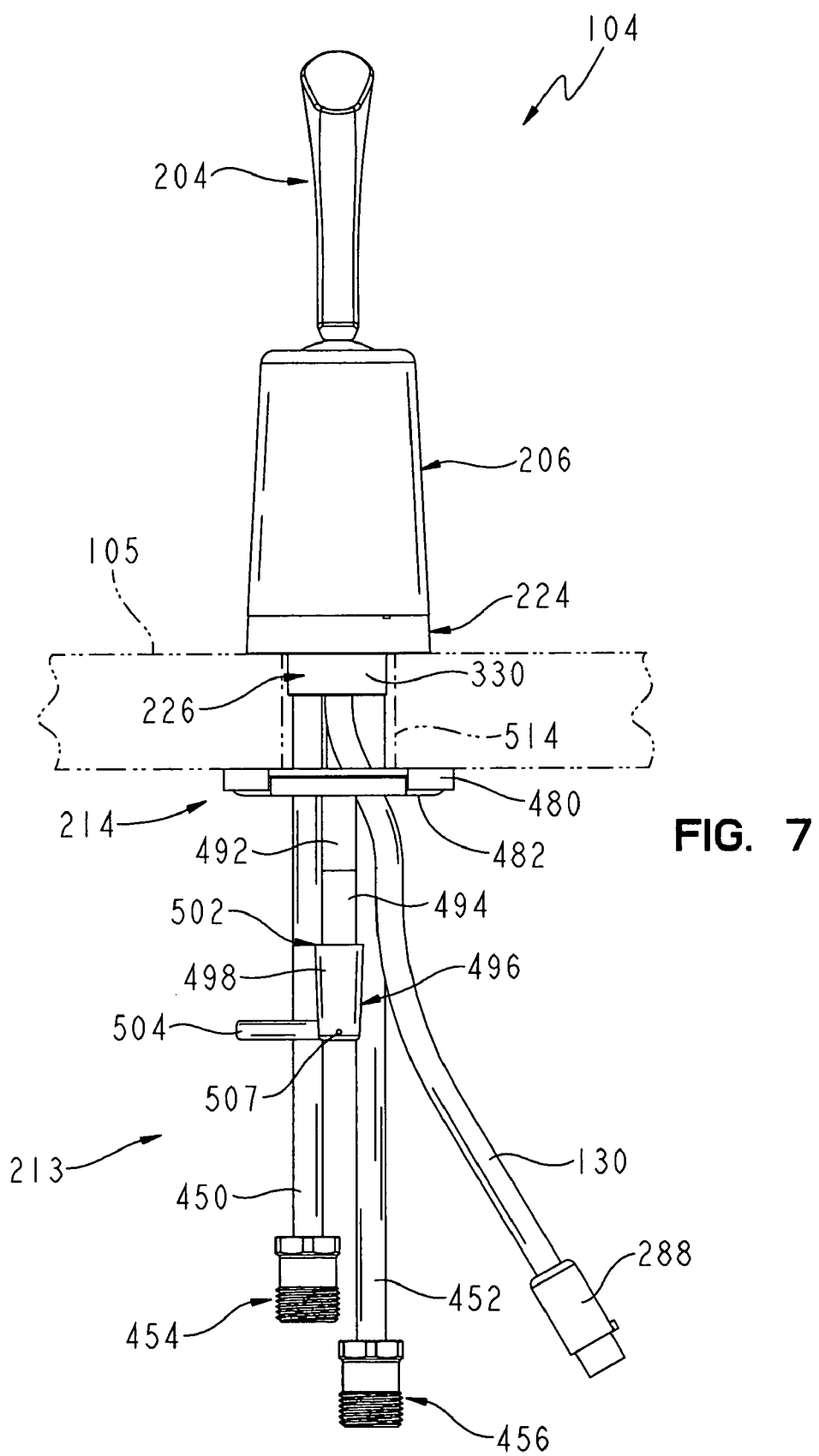
FIG. 7 is a front elevational view of the valve body assembly of FIG. 1.

Referring now to FIGS. 5 and 16, base 224 is substantially ring-shaped and formed of an electrically insulating material such as plastic. Base 224 includes a central opening 316, a pair of upwardly projecting latches 318a and 318b, and a plurality of recesses 322. Also extending into central opening 316 is a cable clip 324 for coupling with a cylindrical strain relief sleeve 326 attached to cable 130 (FIG. 4). Additional details regarding the cable clip 324 and sleeve 326 are provided in U.S. Provisional Patent Application Ser. No. 60/662, 107, filed Mar. 14, 2005, titled "SPOUT ASSEMBLY FOR AN ELECTRONIC FAUCET AND METHOD FOR PROVIDING STRAIN RELIEF OF A CABLE", which has been incorporated by reference herein. Base 224 is sufficiently tall that water will not bridge over base 224 to outer sleeve 206 when assembly 104 is mounted to sink deck 105 (FIG. 7).

An annular gasket 327, illustratively formed of foam, may be positioned intermediate sleeve 222 and base 324. Gasket 327 includes a pair of notches 329 to accommodate tabs 312 of inner sleeve 222.

Figure 17:
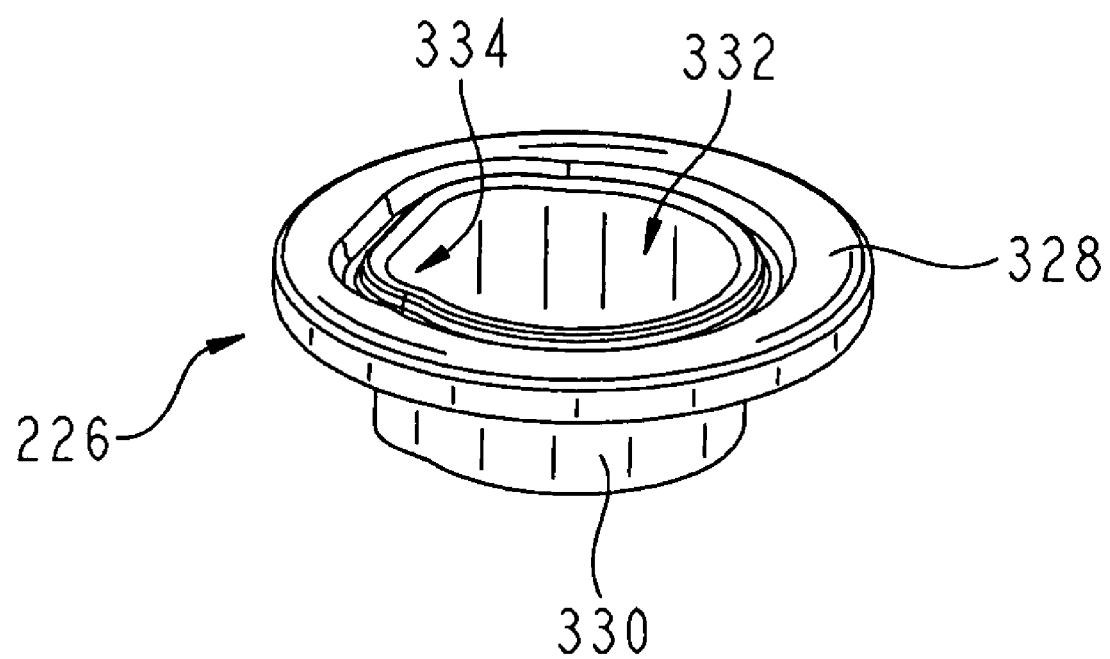
FIG. 17 is a perspective view of the deck gasket of FIG. 4.

As shown in FIGS. 4 and 17, gasket 226 includes a ring 328 and a collar 330 extending downwardly from ring 328. Ring 328 and collar 330 together define a central opening 332 configured to receive waterway assembly 213. Opening 332 may include an extension 334 for receipt of cable 130 therethrough. Gasket 226 is made of electrically insulating, flexible material such as rubber.

Referring now to FIGS. 6 and 8 through 10, movable valve member 202 illustratively a substantially hollow ball or sphere 336 having a hot water opening 338, a cold water opening 340, a pair of outlet openings 342, and a guide groove 344. The ball 336 includes a connecting passageway 346 to provide fluid communication between the hot water opening 338, the cold water opening 340, and the outlet openings 342. As should be apparent to one of ordinary skill in the art, openings 338 and 340 are spaced to selectively align with hot water inlet 252 and cold water inlet 254 of valve housing 218 such that movement of ball 336 within cavity 250 varies the amount of hot and/or cold water that flows into ball 336 in a conventional manner. The water mixture that flows into ball 336 flows out through outlet openings 342 and around the outer surface 348 of ball 336 to outlet opening 276 of valve housing 218. Hot water inlet 252 and cold water inlet 254 are formed through stand-offs or seals 350 and 352 that extend into cavity 290 to space ball 336 from lower wall 258 to permit the above-described outlet flow. Valve member 202 further includes a rod or stem 354, and a magnet 356 which is coupled to the interior surface of ball 336 for use in detecting the position of valve member 202 and handle 204 in the manner further described below.

While in the illustrative embodiment, magnet 356 is coupled to valve member 202, it should be appreciated that magnet 356 may be supported in any location configured to detect when the valve member 202 is in a closed (OFF) position and/or an open (ON) position. For example, magnet 356 may be coupled to handle 204 which moves together with valve member 202.

Figure 11:
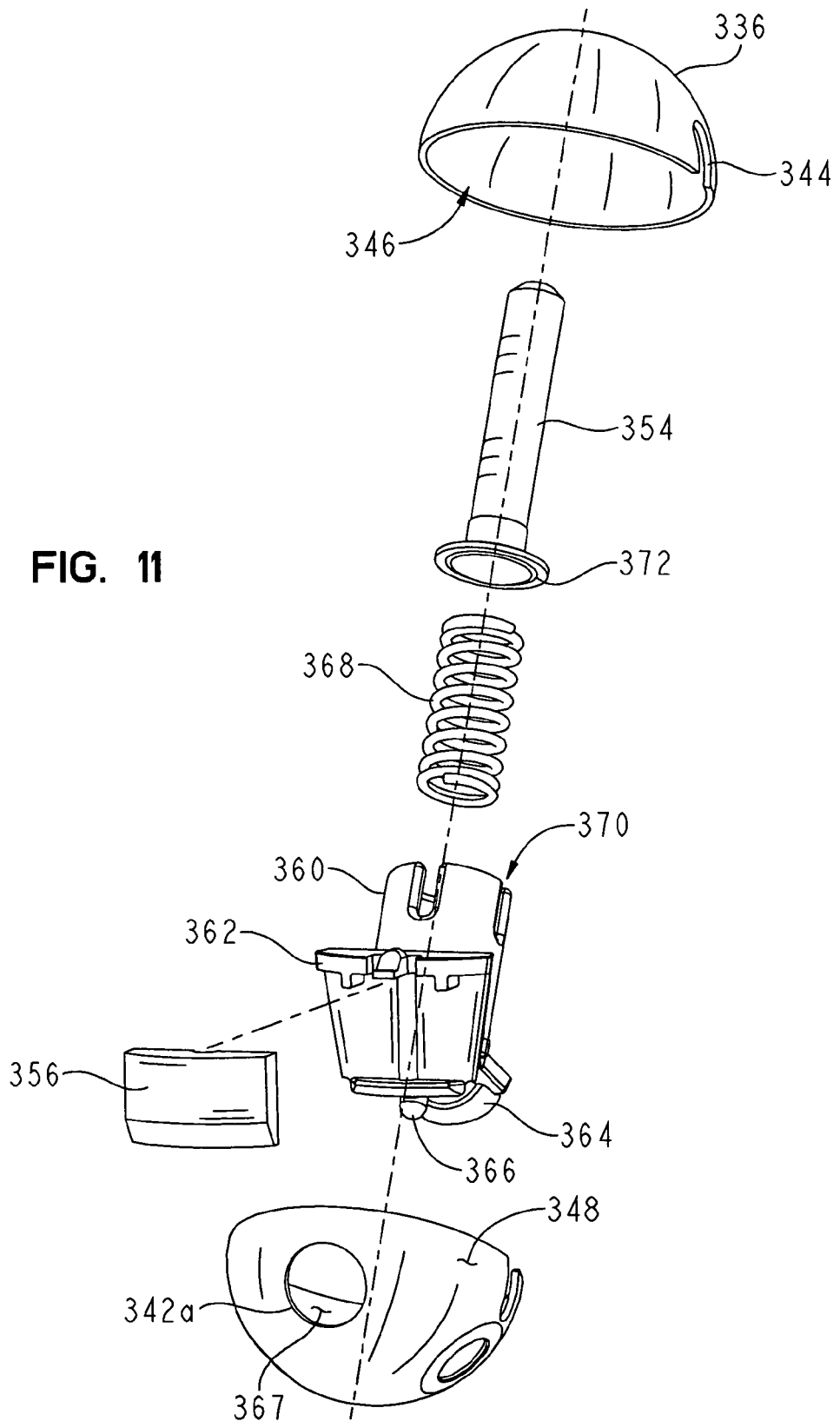
FIG. 11 is an exploded perspective view of the valve member, the handle, and the valve housing of FIG. 4, showing the valve member in an OFF position.

With reference to FIGS. 6 and 11, a holder 358 illustratively supports magnet 356 within the connecting passageway 346 of the ball 336. Illustratively, the holder 358 includes a body 360 having a retainer 362 for supporting the magnet 356 adjacent outlet opening 342a. The magnet 356 may be secured to retainer 362 in a conventional manner, such as by way of snap fit, adhesives, etc. The body 360 further includes an annular support or ring 364 received with outlet opening 342b, and a peg or post 366 configured to contact the inner surface 367 of ball 336. A spring 368 is received within a receiving recess 370 of body 360 and contacts a base 372 of stem 354. As may be appreciated, spring 368 exerts a biasing force against holder 358 thereby facilitating engagement between post 366 and inner surface 367 of ball 336 and, as such, retain holder 358 within connecting passageway 346.

Referring now to FIGS. 4 and 6, guide ring 228 includes an upper portion 376 and a lower portion 378, with a central opening 380. Guide ring 228 may be formed from a flexible material such as rubber to provide a water tight seal between valve cavity 250 and connector ring 230. Integral with lower portion 378 is a bearing surface 382 for engaging in a low friction manner the outer surface of ball 336 during movement of ball 336 within cavity 250 as is further described below. Upper portion 376 has a smaller diameter than lower portion 378, and is configured to be received by connector ring 230.

Figure 14:
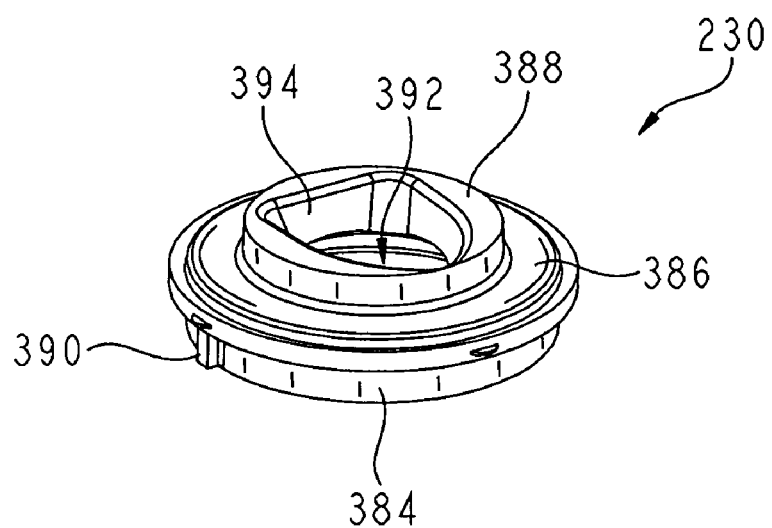
FIG. 14 is a perspective view of the guide ring of FIG. 4.

Referring now to FIGS. 2, 6, and 14, connector ring 230 includes a cylindrical side wall 384, an upper wall 386, and an extension 388. An alignment tab 390 extends laterally outwardly from side wall 384. Side wall 384 and upper wall 386 together substantially define an interior area 392 for receiving upper portion 376 of guide ring 364. Upper wall 386 defines a guide opening 394 for limiting movement of stem 354 during adjustment of water flow.

With reference to FIGS. 4 through 6, bonnet 232 includes side wall 396 having a chamfered surface 398 and defining a central opening 400 and an interior area 402. Side wall 396 further includes interior threads 404 and a circumferential groove 406 in its interior surface 408 for receiving a conventional anti-seize ring 410. Fixedly positioned within central opening 400 is a plastic insert 412 that receives extension 388 of connector ring 230 and permits rotation of bonnet 232 relative to connector ring 230 with reduced friction engagement between insert 412 and extension 388. Plastic insert 412 includes a plurality of notches 414 and external threads 416 that mate with internal threads 418 extending from bonnet side wall 396 into interior space 402. Using a tool to engage notches 414, insert 412 may be rotated relative to side wall 396, and as a result of the mating of the bonnet threads 418 and the insert threads 416, move farther into or out of central opening 400. As should be apparent from the disclosure herein, as insert 412 moves farther into central opening 400, it forces connector ring 230 against guide ring 228, and guide ring 228 against ball 336, thereby increasing the resistance of ball 336 to movement using handle 204 as described herein.

Figure 18:
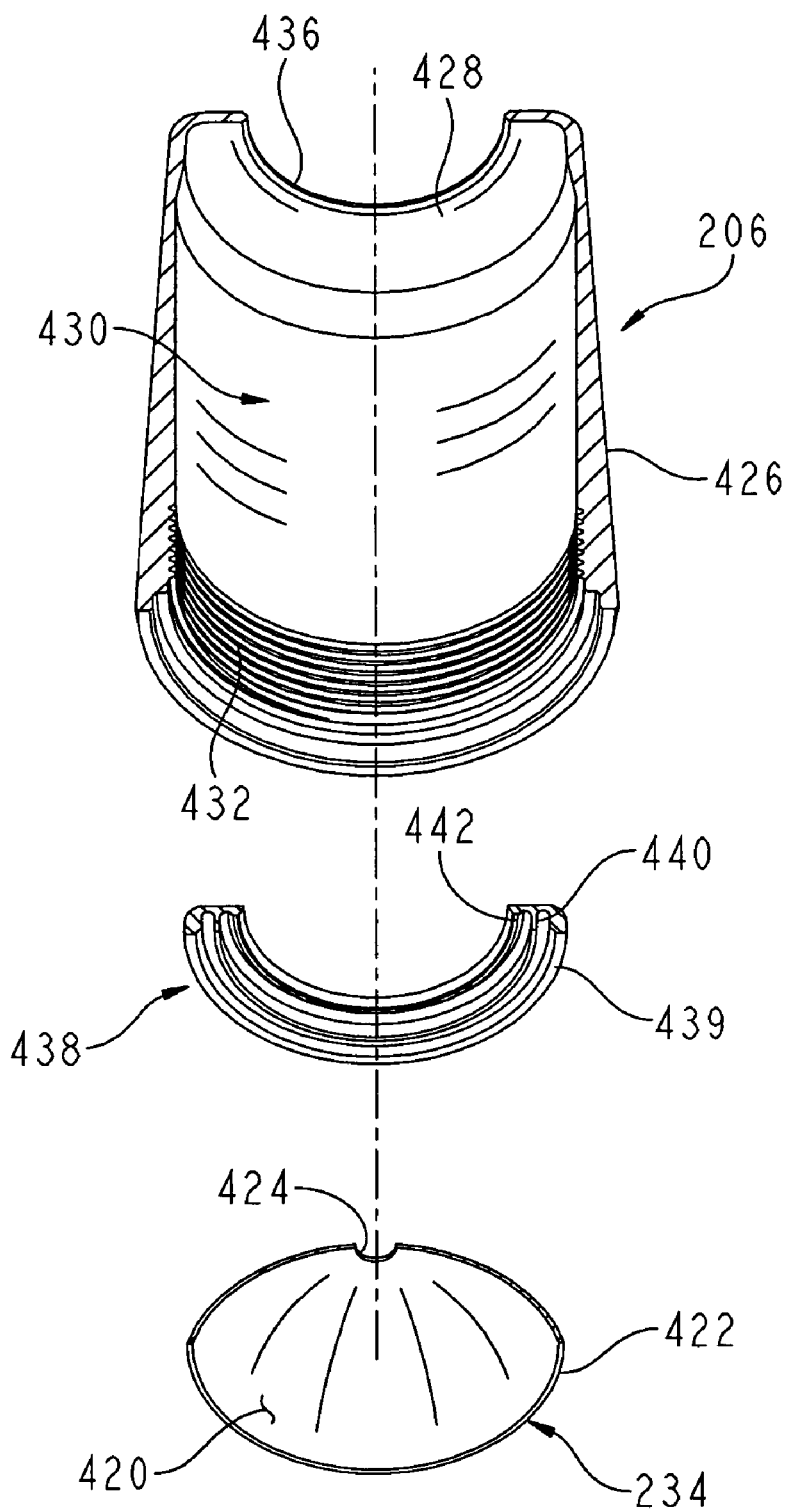
FIG. 18 is an exploded perspective view, in cross-section, of the outer sleeve, dome gasket, and dome shield of FIG. 4.

Referring now to FIGS. 6 and 18, dome 234 is hemispherical in shape, including an inner surface 420 and an outer surface 422. A central bore 424 is formed through dome 234 to receive stem 354 of valve member 202 as is further described below.

As best shown in FIGS. 6 and 18, outer sleeve 206 includes a substantially cylindrical side wall 426 and an upper wall 428 (FIG. 1), which together form a hollow interior space 430. Side wall 426 includes internal threads 432 (FIG. 18) for mating with threads 304 of inner sleeve 222 as is further described below. Upper wall 428 forms a central opening 436 (FIG. 1) which receives handle 204 and a portion of dome 234. Outer sleeve 206 is formed of a conductive material such as stainless steel, brass, copper, etc. It should be understood that outer sleeve 206 may be formed in a variety of different shapes to appeal to the varying tastes of consumers.

A flexible seal 438 is received intermediate the outer sleeve 206 and the dome 234. Seal 438 includes an outer annular ring 239, an inner annular ring 440, and a substantially planar gasket portion 442. Inner annular ring 440 acts as a lip seal to prevent water from entering interior space 444 (FIG. 5). Gasket portion 440 provides a wear washer or surface for the dome 234 and also acts as a secondary sealing surface for the dome 234.

With reference to FIGS. 4 and 6, a spring 446 is concentrically received around stem 354 intermediate the inner surface 420 of dome 234 and the outer surface 348 of ball 336. As detailed herein, as the outer sleeve 206 is threaded onto the inner sleeve 222, spring 446 is compressed, thereby forcing the dome 234 to expand the ring 440 and compress against the gasket portion 440. More particularly, outer sleeve 206 bottoms out on the inner sleeve 222 at shoulder 448 (FIG. 5). The spring 446 facilitates accommodation of tolerances while maintaining sealing engagement with seal 438.

Referring now to FIGS. 3 through 5, waterway assembly 13 includes hot water and cold water inlet tubes 450 and 452 having conventional fittings 454 and 456, respectively, attached at their ends to facilitate connection to supply lines 101A and 101B for hot and cold water (FIG. 1). More particularly, hot water inlet tube 450 is configured to supply hot water to hot water inlet 346 of valve housing 218, while cold water inlet tube 452 is configured to supply cold water to cold water inlet 348 of valve housing 218. Illustratively, the fittings 454 and 456 each include a conventional quick release coupling 458 and 460. An outlet tube 462 includes an end 464 configured to be coupled to mixed water conduit 131 for connection to spout assembly 102 for use in connection with valve body assembly 104. An O-ring 466 is fitted into a peripheral groove to seal the connection to the mixed water conduit 131. As shown in FIG. 5, tubes 450 and 452 are soldered or otherwise connected to openings 272 and 274 of valve housing 218.

Figure 10:
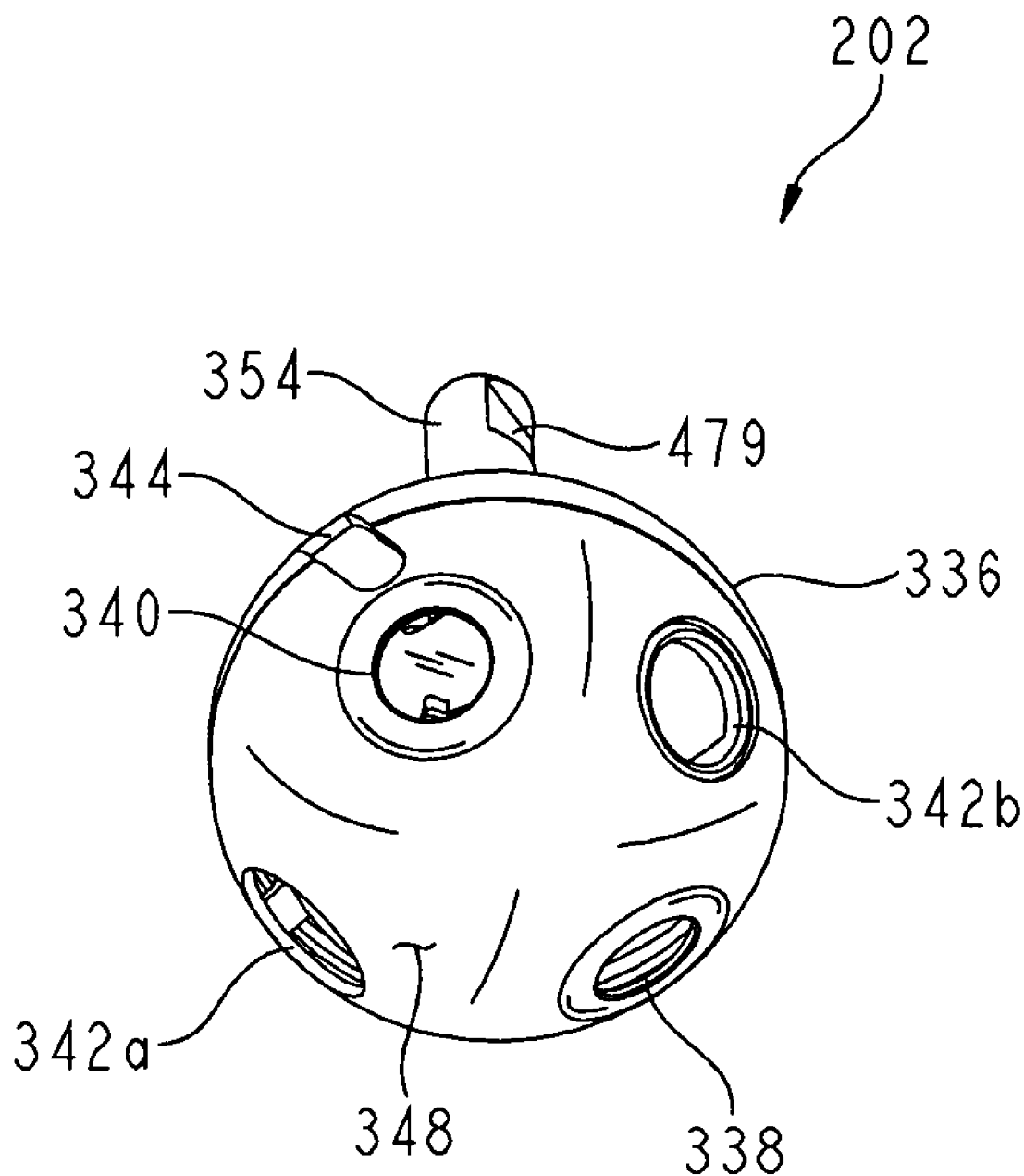
FIG. 10 is a perspective view of the valve member of FIG. 4.

As best shown in FIGS. 3 through 5, handle 204 includes a tapered body 470 having a first end 472 and a second end 474. A central bore 476 extends upwardly from second end 474 of body 470. The handle 204 may be secured to the stem 354 of ball 336 through a set screw 478 which engages a flat 479 formed on stem 354 (FIG. 10).

Referring now to FIGS. 4 and 7, mounting assembly 214 includes a metallic base 480 and a plastic plate 482 coupled to base 480. Both base 480 and plate 482 include cut-outs 484 and 486 for receiving tubes 450, 452, 462 and cable 130 as is further described below. Both base 480 and plate 487 also include bores 488 and 490 for receiving threaded portion 280 of attachment post 278 as is also described below. Referring further to FIGS. 4 and 7, mounting assembly 214 may include a plurality of hollow, cylindrical spacers 492, 494, and a fastener 496. Fastener 496 includes a substantially hollow body 498 having a nut 500 at its open end 502. A lever 504 is pivotally attached to the other end 506 of body 498 at a pivot point 507.

Valve body assembly 104 is illustratively assembled and attached to sink deck 105 in the following manner. Inner sleeve 222, base 224, and gasket 226 are slid over waterway assembly 213 as shown in FIGS. 4 and 5. Cable 130 is also fed through gasket 226. As shown in FIGS. 4, 15, and 16, base 224 and inner sleeve 222 are rotated relative to one another such that alignment tabs 312a and 312b of inner sleeve 222 are aligned with appropriately sized recesses 322 of base 224, and latches 318a and 318b of base 224 are aligned with openings 308. Additionally, cylindrical strain relief sleeve 326 (FIG. 4) attached to cable 130 is snapped into cable clip 324 or positioned above cable clip 324 (i.e., adjacent inner sleeve 222) to resist movement of cable 130 away from PCB 220 after installation of valve body assembly 104.

Next, as shown in FIGS. 3, 15, and 16, base 224, gasket 327, and inner sleeve 222 are brought together such that alignment tabs 312a and 312b enter recesses 322, and latches 318a and 318b snap into openings 308, thereby resisting separation of base 224 from inner sleeve 222. As shown in FIG. 5, after base 224 and inner sleeve 222 are coupled together, spacer 314 is positioned on flange 238 of valve housing 218, and sleeve 222 is then moved over lower portion 240 of valve housing 218 such that tab 302 of inner sleeve 222 is positioned into notch 260 of valve housing flange 238. In this manner, inner sleeve 222 and base 224 are prevented from rotating relative to valve housing 218.

Valve member 202, guide ring 228, connector ring 230 and bonnet 232 may next be attached to upper portion 236 of valve housing 218. Referring to FIGS. 4 and 6, stem 354 of valve member 202 is passed through central opening 380 of guide ring 228 and through guide opening 394 of connector ring 230. Upper portion 376 of guide ring 228 is also inserted into interior area 392 of connector ring 230.

Next, ball 336 of valve member 202 is inserted into valve cavity 250 of valve housing 218. During installation of ball 336, guide groove 344 of ball 336 receives a guide lug 508 (FIG. 8) extending into cavity 250 which permits forward, reverse and limited side-to-side movement of ball 336 relative to cavity 250, but prevents rotational movement of ball 336 within cavity 250. As shown in FIG. 6, both ball 336 and guide ring 228 are substantially completely received within cavity 250 such that ball 336 rests substantially on seals 350 and 352 within cavity 250 and lower portion 378 of guide ring 228 is seated on a shoulder 510 formed within cavity 250 to form a seal. A portion of side wall 384 of connector ring 230 is also received within cavity 250, and alignment tab 390 of connector ring 230 is positioned within notch 260 of valve housing upper portion 236 to prevent rotation of connector ring 230 relative to upper portion 236.

Referring now to FIGS. 4 and 6, bonnet 232 is next placed over upper portion 236 of valve housing 218 such that stem 354 of valve member 202 extends through central opening 400 of bonnet 232. Bonnet 232 is then screwed onto upper portion 236 so that internal threads 404 of bonnet 232 thread onto external threads 242 of upper portion 236. In this manner, bonnet 232 is tightened onto valve housing 218. Next, a spring 446 is positioned over threaded stem 354. One end of spring 446 engages ball 336. As shown in FIG. 6, dome 234 is then placed over threaded stem 354 such that stem 354 extends through central bore 424 of dome 234. It should be understood that the other end of spring 446 engages dome 234 and biases dome 234 away from bonnet 234, accounting for the stack up of tolerances of the various components.

Referring now to FIGS. 4 and 5, outer sleeve 206 is next fitted over dome 234, bonnet 232, connector ring 230, guide ring 228, valve member 202, valve housing 218, and inner sleeve 222. Internal threads 432 of outer sleeve 206 are threaded 304 onto external threads of inner sleeve 222 until outer sleeve 206 fully seats against shoulder 448 of inner sleeve 222. As shown in FIG. 5, in this position, dome 234 extends partially through central opening 436 of outer sleeve 206. As should be apparent from the forgoing, however, dome 234 does not contact upper wall of outer sleeve 206. Instead, dome 234 is biased against seal 438. Because inner sleeve 222, base 224, and seal 438 are made of non-conducting material, outer sleeve 206 is electrically insulated from valve housing 218 and the conductive structure in contact with valve housing 218.

Now referring to FIGS. 4 and 5, handle assembly 204 is attached to stem 354 of valve member 202 by inserting stem 354 into bore 476 formed within second end 474 of body 470 until end 474 is seated against dome 234. Next, screw 478 is inserted through body 470 into engagement with flat 479, such that the handle 204 is clamped to the stem 354.

As shown in FIG. 5, gasket 226 is next fitted into a lower recess 512 formed in base 224. More specifically, ring 332 of gasket 226 is received by recess 512. Collar 330 of gasket 226 extends from ring 328 over tubes 450, 452, 462, attachment post 278 and cable 130. Attachment post 278, and cable 130 may now be placed through an opening 514 in sink deck 105 such that collar 330 extends into the opening 514, and ring 328 and base 224 rest on the upper surface of the sink deck 105 (FIG. 7). As should be apparent from the foregoing, gasket 226 and base 224 electrically isolate all of the other components of valve body assembly 104 from the sink deck 105.

Referring now to FIGS. 4 and 7, the valve body assembly 104 is secured to the sink deck 105 by first placing metallic base 480 and a plastic plate 482 over tubes 450, 452, 462 and cable 130. More specifically, tubes 450, 452, 462 and cable 130 are passed into cut-out 484 and 486 of base 480 and plate 482 of mounting assembly 214. Next, base 480 and plate 482 are slid upwardly toward gasket 226, and threaded portion 280 of attachment post 278 is passed through bores 488 and 490 of base 480 and plate 482. As shown in FIG. 7, the sink deck 105 is sandwiched between gasket 226 and plate 482 of mounting assembly 214, which is also non-conductive and isolates waterway assembly from the sink deck 105. Next, spacer 492 is fitted over threaded portion 280. It should be understood that depending upon the thickness of the sink deck 105, spacer 492 may not be necessary, or both spacer 492 and spacer 494 (or more spacers) may be necessary, to firmly mount valve body assembly 104 to the sink deck 105 in the manner described herein.

Fastener 496 is next attached to threaded portion 280. More specifically, nut 500 of fastener body 498 is threaded onto threaded portion 280 by rotating fastener 496 relative to attachment post 278. In this manner, the end of threaded portion 280 may extend partially into the hollow central portion of body 498. Referring now to FIG. 7, eventually end 502 of fastener body 498 seats against spacer 494. Further rotation of fastener 496 forces spacers 492 and 494 against base 480 of mounting assembly 214, thereby compressing the sink deck 105 between plate 482 of mounting assembly 214 and gasket 226 and base 224. Lever 504 may be rotated into the position shown in FIG. 3 to provide leverage for final tightening of fastener 496 to firmly mount valve body assembly 104 to the sink deck 105.

When fully assembled and installed, valve body assembly 104 appears as depicted in FIG. 1. Supply lines 101A and 101B are attached to fittings 454 and 456, and mixed water conduit 131 is coupled to end 464 of outlet tube 462 to route water that flows through valve assembly 104 to the spout assembly 102. Finally, the plug 288 at the free end of cable 130 is attached to controller 116 to facilitate operation of valve body assembly 104 in the manner described herein.

Referring now to FIG. 1, valve body assembly 104 is shown connected to controller 116 which, among other things, controls actuator driven valve 132. As detailed herein, valve 132, when activated, permits water to flow from valve body assembly 104 to spout assembly 102. PCB 220 of valve body assembly 104 includes, among other things, position sensor 208, illustratively a magnetic field sensor such as a Hall Effect sensor. PCB 220 also illustratively includes capacitive touch sensor 210, such as a QProx™ sensor manufactured by Quantum Research Group. A schematic diagram of electronics 292 of PCB 220 is shown in FIG. 19.

Figure 13:
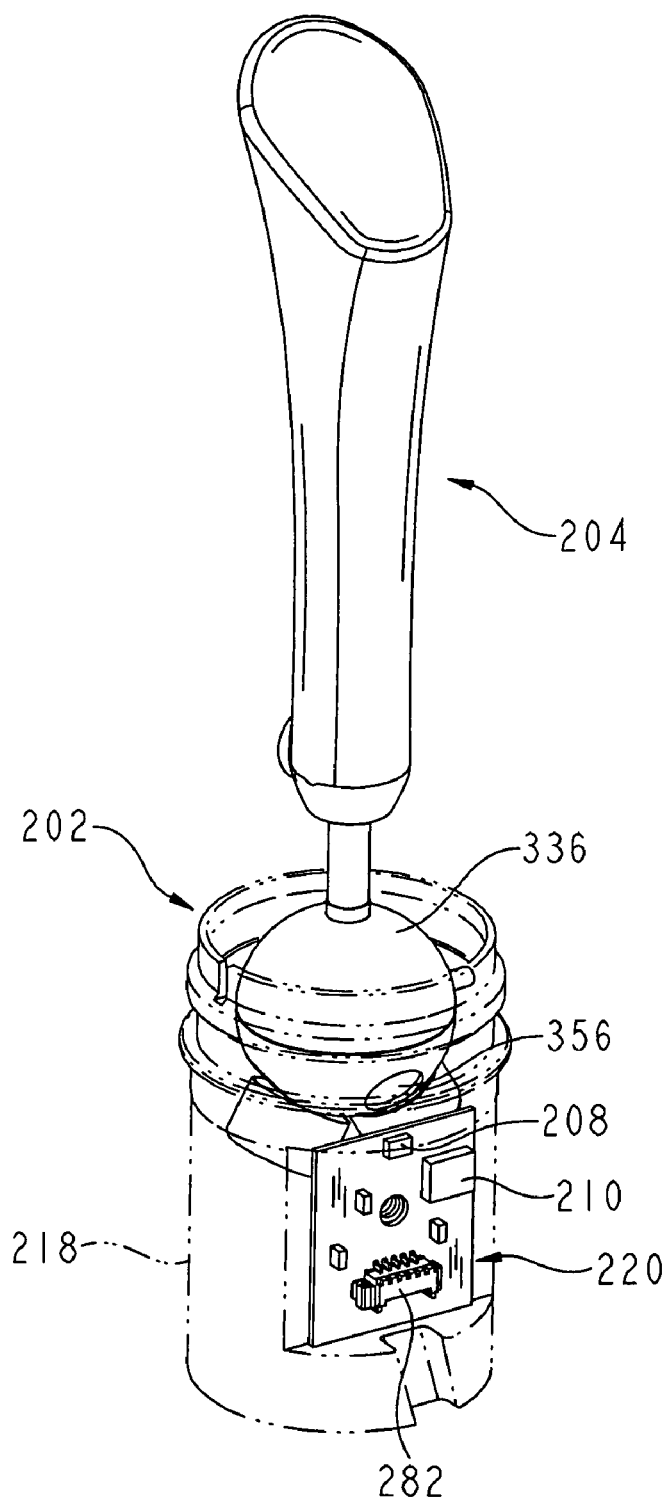
FIG. 13 is a perspective view similar to FIG. 12, showing the valve member in an ON position.

As indicated in FIGS. 12 and 13, handle 204 may be moved from an OFF (closed) position (shown in FIG. 12) wherein magnet 356 of valve member 202 is adjacent Hall Effect sensor 208, to any of a plurality of ON (open) positions (one position is shown in FIG. 13) wherein magnet 356 is spaced farther away from Hall Effect sensor 208. It should be understood that the OFF position actually includes a plurality of positions wherein handle 204 is adjusted angularly away from Hall Effect sensor 208, but not by an amount necessary to cause water flow through valve member 202. In one embodiment, this angular adjustment may be approximately seven degrees. When handle 204 is in the OFF position, cold water opening 340 of ball 336 is not aligned with cold water inlet 348 of valve housing 218 and hot water opening 330 is not aligned with hot water inlet 346. Thus, water flow through valve body assembly 104 to spout assembly 102 is prevented. The proximity of magnet 356 to Hall Effect sensor 208 when handle 204 is in the OFF position causes Hall Effect sensor 208 to supply a "valve OFF signal" to controller 116 through cable 130. When handle 204 is moved out of the OFF position, openings 338 and 340 of ball 336 align with inlets 252 and 254 (in varying amounts depending upon the adjusted position of handle 204 which corresponds to the desired flow rate and temperature of water flow), thereby permitting water to flow through outlet openings 342 of ball 336 and mixed water conduit 131 to spout assembly 102. Additionally, as magnet 356 is spaced farther from Hall Effect sensor 208, PCB 220 provides a "valve ON signal" to controller 116.

Touch sensor 210 detects, according to principles of capacitive sensing that are known in the art, when a user touches either outer sleeve 206 or handle 204 of valve body assembly 104. It should also be understood that a similar touch sensor is included on spout 194 as explained in more detail in one or more of the Related Applications including U.S. Provisional Patent Application Ser. No. 60/661,982, filed Mar. 14, 2005, titled "POSITION-SENSING DETECTOR ARRANGEMENT FOR CONTROLLING A FAUCET," and U.S. patent application Ser. No. 10/755,581, filed Jan. 12, 2004, titled "MULTI-MODE HANDS FREE AUTOMATIC FAUCET." When a user touches either component of valve body assembly 104 (or spout assembly 102) for a relatively short period of time (e.g., 50 ms to 330 ms), touch sensor 210 causes PCB 220 to send a "tapped signal" to controller 116 through cable 130. If, on the other hand, a user touches either component of valve body assembly 104 for a relatively long period of time (e.g., more than 330 ms), touch sensor 210 causes PCB 220 to send a "grasped signal" to controller 116 through cable 130. A grasped signal may result from the user grasping handle 204 to move handle 204 out of the OFF position, and adjust the flow and temperature of the water through valve body assembly 104.

As described in more detail in one or more of the Related Applications, IR sensor 103A of spout assembly 102 detects the presence of an object (e.g., a user's hands) within a detection zone below or otherwise adjacent spout assembly 102. When activated, IR sensor 103A causes an "activate spout signal" to be generated by controller 116. It should be understood that in operation, IR sensor 103A periodically determines whether an object is adjacent spout assembly 102 by emitting a signal, thereby consuming power supplied by power source 117.

Various modes of operation are illustratively provided by valve body assembly 104. In one mode, a user may grasp handle 204 and move the valve assembly 104 into the OFF position. As explained above, this generates a valve OFF signal for receipt by controller 116. In response, controller 116 disables IR sensor 103A. There is no need for IR sensor 103A to detect the presence of objects adjacent spout assembly 102 because, with handle 204 in the OFF position, water cannot flow to spout assembly 102. As such, IR sensor 103A no longer emits periodic signals to detect the presence of objects adjacent spout assembly 102, thereby consuming less power. In another situation, the user may grasp handle assembly 204 and move it out of the OFF position. Hall Effect sensor 208 then generates a valve ON signal, which causes controller 116 to activate valve 132. Consequently, water flows through valve body assembly 104 and spout assembly 102. The valve ON signal also causes controller 116 to enable IR sensor 103A. If the user leaves the sink unattended for an extended period of time (e.g., five minutes), a timer (not shown) in controller 116 times out, and causes controller 116 to deactivate valve 132, thereby stopping the flow of water even though handle 204 is in an ON position. This feature may prevent wasted water and damage associated with overflow.

If, on the other hand, the user leaves handle 204 in the ON position, but taps handle 204, outer sleeve 206, or spout assembly 102, touch sensor 210 causes PCB 220 to send a tapped signal to controller 116, which in turn deactivates valves 132 to stop water flow through valve body assembly 104, even though handle 204 remains in the ON position. IR sensor 103A remains enabled. If instead of tapping handle 204 or outer sleeve 206, the user had grasped either handle 204 or outer sleeve 206, then touch sensor 210 would have caused PCB 220 to send a grasped signal to controller 116, which would not have deactivated valve 132 because controller 116 is configured to construe a grasped signal as meaning valve body assembly 104 is in use, such as when a user adjusts the water flow and temperature using handle 204. IR sensor 103A remains enabled.

Alternatively, if, instead of tapping or grasping handle 204, outer sleeve 206 or spout assembly 102, the user places, for example, his or her hands under spout assembly 102 after moving handle 204 into an ON position, IR sensor 103A detects the presence of the user's hands and generates an activate spout signal. As spout assembly 102 is already activated, this signal does not affect operation of the system, and the water continues to flow. Even after the user removes the user's hands from under spout assembly 102, the failure of IR sensor 103A to provide an activate spout signal does not result in controller 116 disabling valve 132 because handle 204 is in an ON position and the time out period has not expired. After the time out period expires, however, and controller 116 has disabled valve 132, if the user places the user's hands under spout assembly 102, IR sensor 103A generates an activate spout signal which causes controller 116 to activate valve 132, causing water to flow. It should be understood that each time handle 204, outer sleeve 206, or spout assembly 102 are touched, the time out period is reset. It should further be understood that the time out period may be programmed into controller 116 and adjusted during set-up.

While this invention has been described as having an exemplary design, the present invention may be further modified within the spirit and scope of this disclosure. For example, the ball 336 and cavity 250 arrangement described above may be replaced with a pair of disks with aligning water openings, one movable relative to the other to facilitate flow and temperature adjustment with a rotary-type valve handle. This application is therefore intended to cover any variations, uses, or adaptations of the invention using its general principles. Further, this application is intended to cover such departures from the present disclosure as come within known or customary practice in the art to which this invention pertains.

The invention claimed is:

1. A valve assembly for use with an electronic faucet, the valve assembly comprising:
   a valve housing having a cavity;
   a magnetic field sensor supported by the valve housing;
   a valve member disposed within the cavity and including a hot water inlet and a cold water inlet, the valve member configured to control the mixture and flow rate of water from the hot water inlet and the cold water inlet delivered to a mixed water outlet, the valve member further including a magnet, the valve member being movable between a first position relative to the sensor to generate a first signal, and a second position relative to the sensor to generate a second signal, wherein the magnet is positioned farther from the sensor when the valve member is in the second position than when the valve member is in the first position; and
   wherein the sensor is in electrical communication with a controller configured to control operation of an actuator driven valve.

2. The valve assembly of claim 1, wherein the valve member is movable between an OFF position wherein the magnet is positioned adjacent the sensor to generate the first signal, and a plurality of ON positions wherein the magnet is positioned farther from the sensor than when the valve is in the OFF position to generate the second signal.

3. The valve assembly of claim 1, further comprising a capacitive sensor supported by the valve housing, the capacitive sensor configured to generate a third signal when the valve housing is in electrical communication with a user.

4. The valve assembly of claim 1, wherein the valve member comprises a ball, said ball forming the hot water inlet, the cold water inlet, the mixed water outlet and a connecting passageway providing fluid communication between the hot water inlet, the cold water inlet, and the mixed water outlet.

5. The valve assembly of claim 4, further comprising a holder supported within the connecting passageway of the ball and including a retaining member operably coupled to the magnet.

6. The valve assembly of claim 5, wherein the holder includes a body and a spring operably coupled to the body and configured to bias the body into engagement with an interior surface of the ball.

7. The valve assembly of claim 1, further comprising a handle extending upwardly from the valve member to facilitate movement thereof.

8. The valve assembly of claim 1, wherein the magnetic field sensor comprises a Hall-effect sensor.

9. The valve assembly of claim 1, further comprising a gasket configured to electrically isolate the valve housing from a sink deck.

10. The valve assembly of claim 1, further comprising:
    a trim dome operably coupled to the valve member;
    an outer sleeve received around the valve housing; and
    a seal positioned intermediate the trim dome and the outer sleeve, the seal including a gasket portion configured to provide a wear surface for the trim dome, and an annular ring configured to provide a lip seal with the trim dome.

11. An electronic faucet assembly comprising:
    a water inlet conduit;
    a delivery spout;
    a valve body in fluid communication with the water inlet conduit and the delivery spout;
    a manual valve member supported by the valve body and configured to move between an open position and a closed position for controlling fluid flow from the water inlet conduit to the delivery spout;
    a sensing element supported by the manual valve member and configured to move with the manual valve member;
    a position sensor located in spaced relation to the sensing element and configured to detect the relative position of the sensing element and in response thereto provide a signal indicative of the position of the manual valve member;
    an actuator driven valve in fluid communication with the manual valve member;
    a proximity sensor having a detection zone, the proximity sensor being configured to generate a proximity signal when the proximity sensor detects the presence of an object within the detection zone; and
    a controller in electrical communication with the position sensor, the actuator driven valve, and the proximity sensor, the controller being configured to deactivate the proximity sensor when the position sensor indicates that the manual valve member is in the closed position.

12. The electronic faucet assembly of claim 11, wherein the sensing element comprises a magnet.

13. The electronic faucet assembly of claim 12, wherein the position sensor comprises a Hall-effect sensor.

14. The electronic faucet assembly of claim 12, wherein the manual valve member is movable between an OFF position wherein the magnet is positioned adjacent the position sensor to generate a first signal, and a plurality of ON positions wherein the magnet is positioned farther from the position sensor than when the valve is in the OFF position to generate a second signal.

15. The electronic faucet assembly of claim 11, wherein the manual valve member includes a ball having a hot water inlet, a cold water inlet, a mixed water outlet and a connecting passageway providing fluid communication between the hot water inlet, the cold water inlet, and the mixed water outlet.

16. The electronic faucet assembly of claim 11, further comprising a gasket configured to electrically isolate the valve body from a sink deck.

17. The electronic faucet assembly of claim 11, further comprising:
   a trim dome operably coupled to the manual valve member;
   an outer sleeve received around the valve body; and
   a seal positioned intermediate the trim dome and the outer sleeve, the seal including a gasket portion configured to provide a wear surface for the trim dome and an annular ring configured to provide a lip seal with the trim dome.

18. A valve assembly for use with an electronic faucet, the valve assembly comprising:
   a valve housing having a cavity;
   a movable valve member disposed within the cavity, the valve member including a ball having a hot water inlet, a cold water inlet, a mixed water outlet and a connecting passageway providing fluid communication between the hot water inlet, the cold water inlet, and the mixed water outlet;
   a holder supported within the connecting passageway of the ball; and
   a magnet operably coupled to the holder.

19. The valve assembly of claim 18, further comprising a magnetic field sensor supported by the valve housing, wherein the valve member is movable between a first position relative to the sensor to generate a first signal, and a second position relative to the sensor to generate a second signal, wherein the magnet is positioned further from the sensor when the valve member is in the second position than when the valve member is in the first position.

20. The valve assembly of claim 19, wherein the magnetic field sensor comprises a Hall-effect sensor.

21. The valve assembly of claim 19, wherein the sensor is in electrical communication with a controller configured to control operation of an actuator driven valve.

22. The valve assembly of claim 18, wherein the holder includes a body and a spring operably coupled to the body and configured to bias the body into engagement with an interior surface of the ball.

23. The valve assembly of claim 18, further comprising a handle operably coupled to a stem of the ball to facilitate movement thereof.

24. A valve assembly for use with an electronic faucet, the valve assembly comprising:
   a valve housing;
   a valve member received within the housing;
   a handle extending outside of the valve housing and operably coupled to the valve member to manually move about a first axis and a second axis positioned in non-parallel relation to the first axis, the valve member movable between a closed position and an open position in response to movement of the handle about the first axis; and
   a magnetic field sensor configured to detect when the valve member is in the closed position.

25. The valve assembly of claim 24, wherein the magnetic field sensor comprises a Hall-effect sensor.

26. The valve assembly of claim 24, further comprising a magnet supported for movement with the valve member.

27. The valve assembly of claim 24, wherein the sensor is in electrical communication with a controller configured to control operation of an actuator driven valve.

28. The valve assembly of claim 24, wherein the valve member includes a hot water inlet and a cold water inlet, the valve member being configured to control the mixture and flow rate of water from the hot water inlet and the cold water inlet delivered to a mixed water outlet.

29. A valve assembly for use with an electronic faucet, the valve assembly comprising:
   a valve housing;
   a valve member received within the valve housing and configured to be fluidly coupled to a hot water source and a cold water source;
   a mixed water outlet in selective fluid communication with the hot water source and the cold water source;
   wherein the valve member is movable in a first direction to control the flow rate of water delivered to the mixed water outlet and movable in a second direction to control the temperature of water delivered to the mixed water outlet;
   a magnet supported for movement with the valve member; and
   a magnetic field sensor configured to generate a first signal when the valve member is in a first position relative to the sensor.

30. The valve assembly of claim 29, wherein the magnetic field sensor is configured to generate a second signal when the valve member is in a second position relative to the sensor, the magnet being farther from the sensor when the valve member is in the second position than when the valve member is in the first position.

31. The valve assembly of claim 29, wherein the valve member includes a hot water inlet fluidly coupled to the hot water source and a cold water inlet fluidly coupled to the cold water source.

32. The valve assembly of claim 31, wherein the valve member comprises a ball including a connecting passageway providing fluid communication between the hot water inlet, the cold water inlet, and the mixed water outlet.

33. The valve assembly of claim 29, wherein the sensor is in electrical communication with a controller to control operation of an actuator-driven valve fluidly coupled to the valve member.

* * * * *